April 24, 1945.　　　D. E. BENCH ET AL　　　2,374,577
MULTIPLE TURRET LATHE
Original Filed Sept. 25, 1941　　11 Sheets-Sheet 1
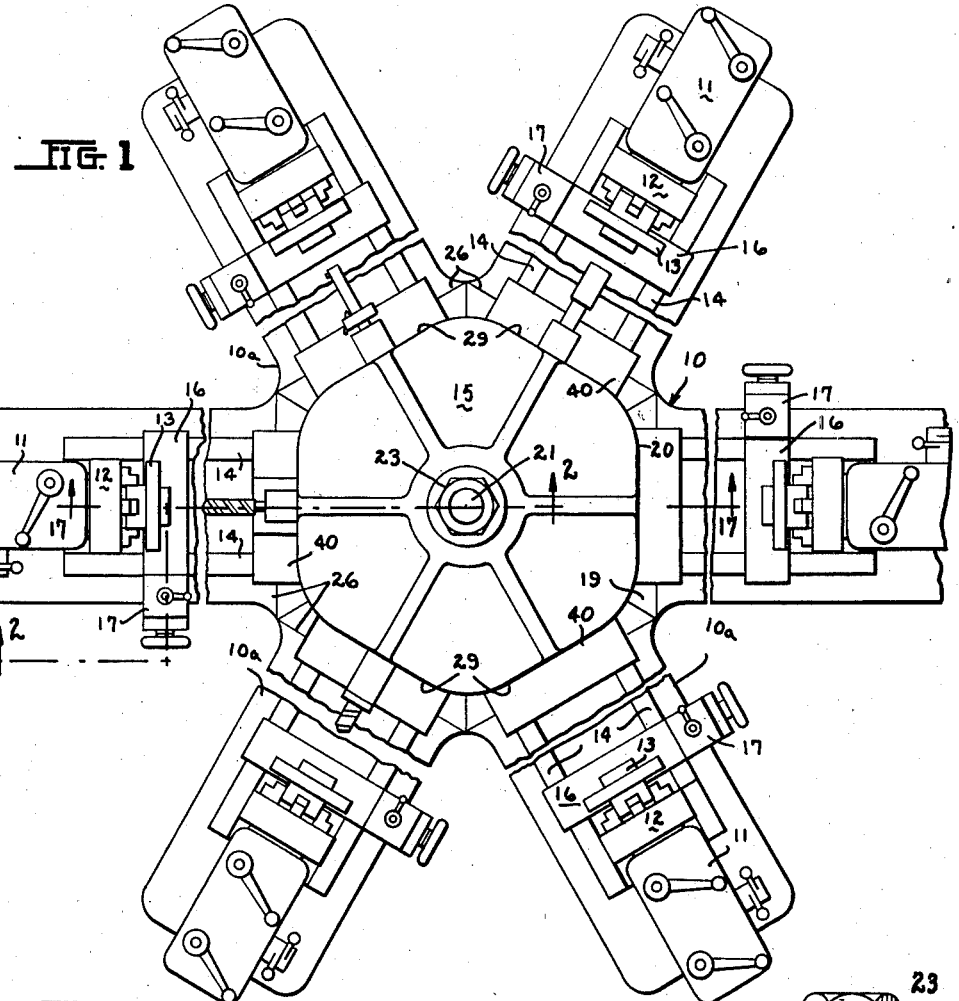
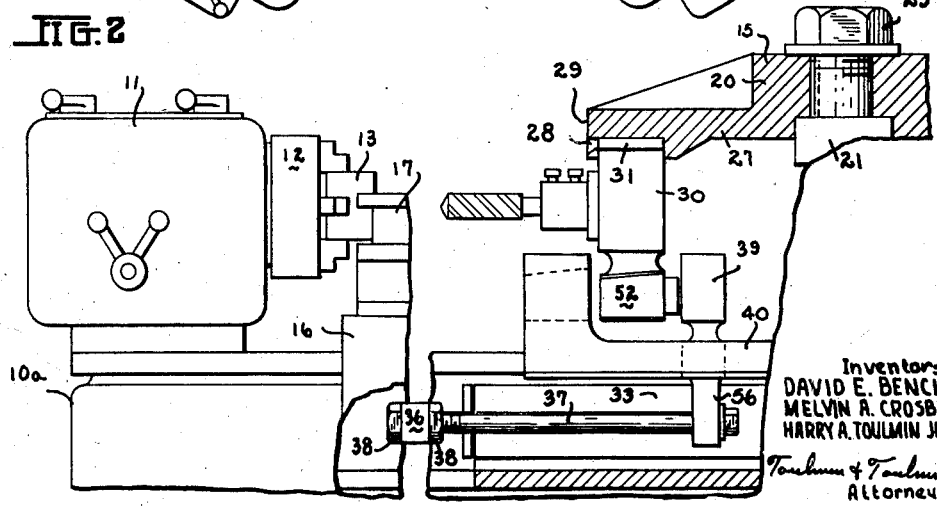
Inventors
DAVID E. BENCH
MELVIN A. CROSBY
HARRY A. TOULMIN JR.
Toulmin & Toulmin
Attorneys April 24, 1945.  D. E. BENCH ET AL  2,374,577
MULTIPLE TURRET LATHE
Original Filed Sept. 25, 1941  11 Sheets-Sheet 2
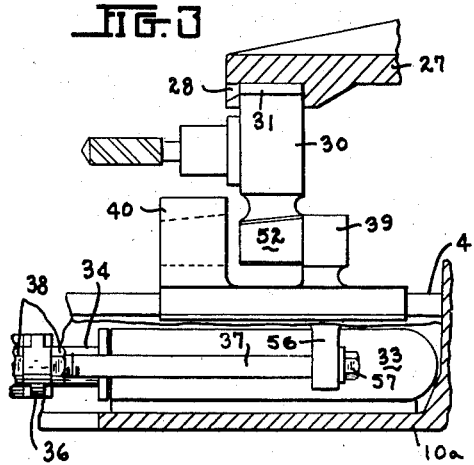
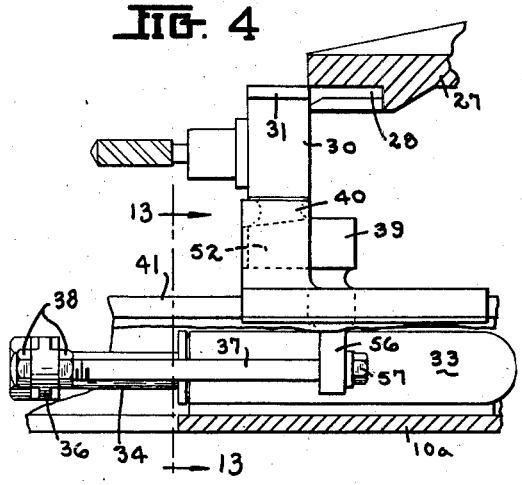
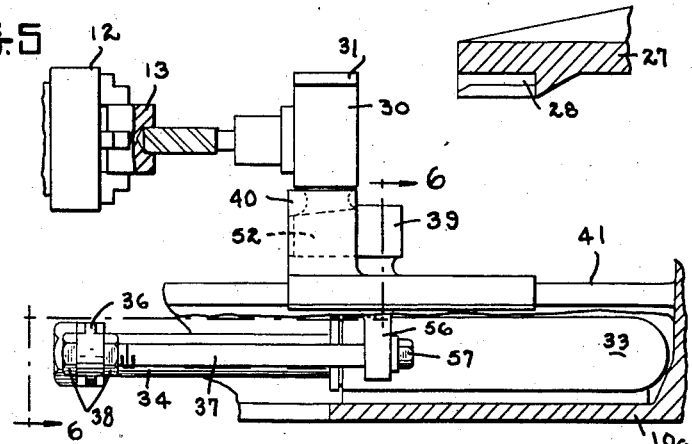
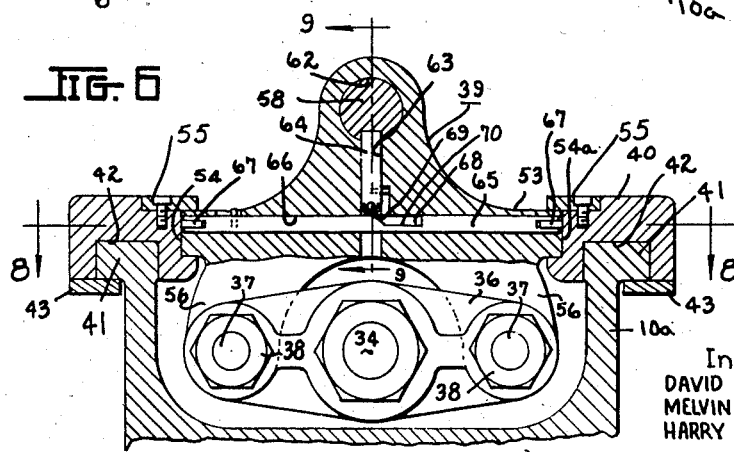
Inventors
DAVID E. BENCH
MELVIN A. CROSBY
HARRY A. TOULMIN JR
by
Toulmin and Toulmin
Attorneys

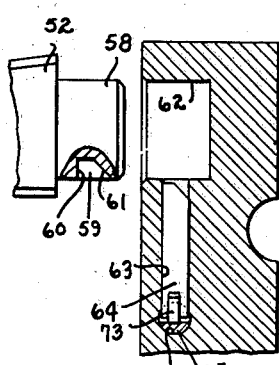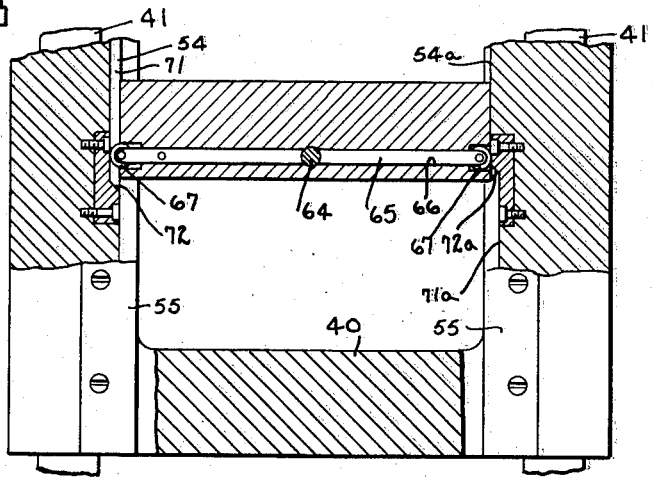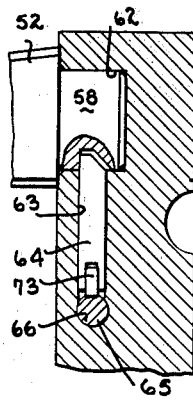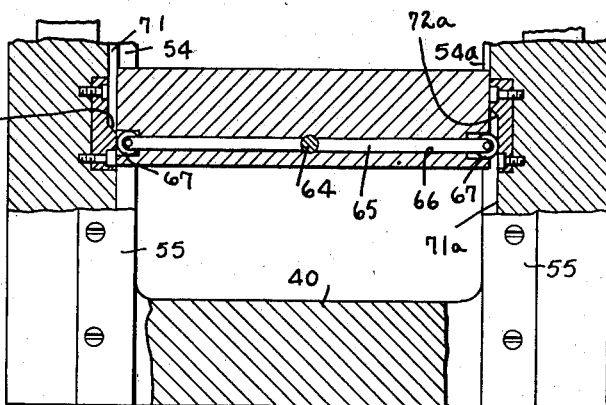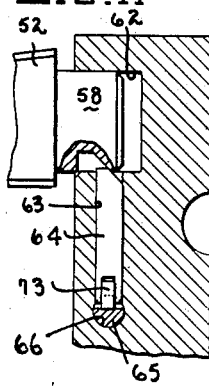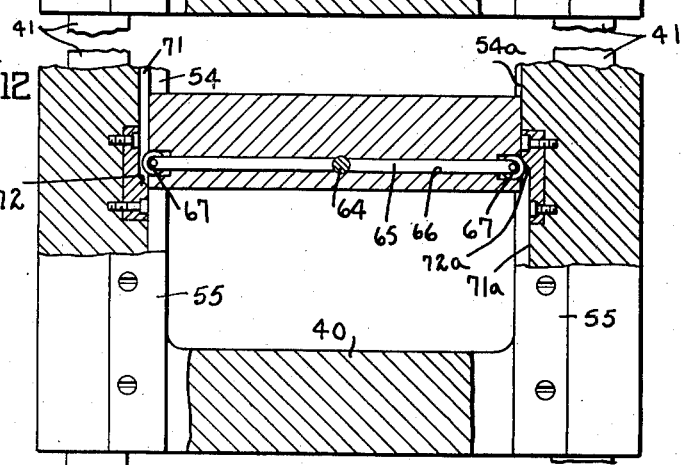

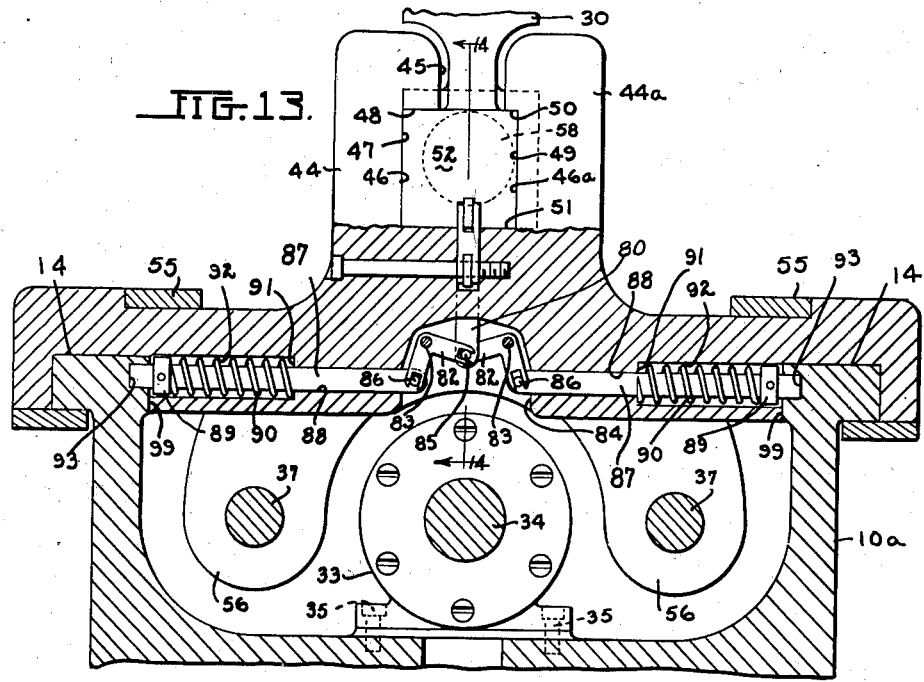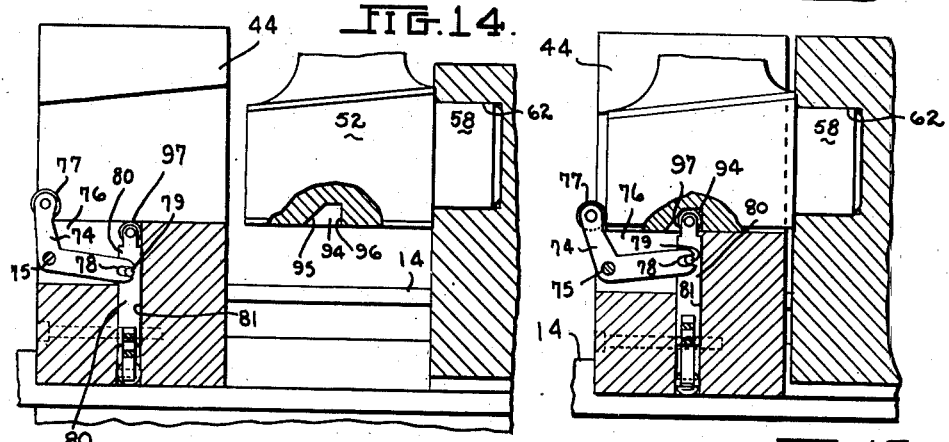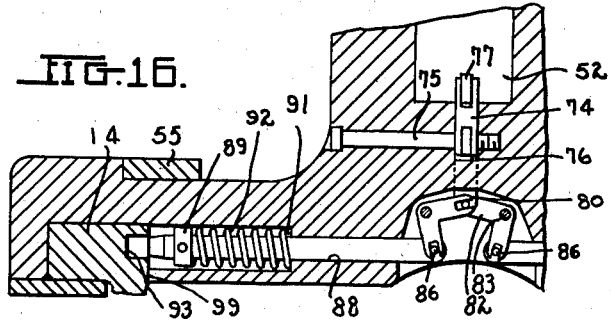

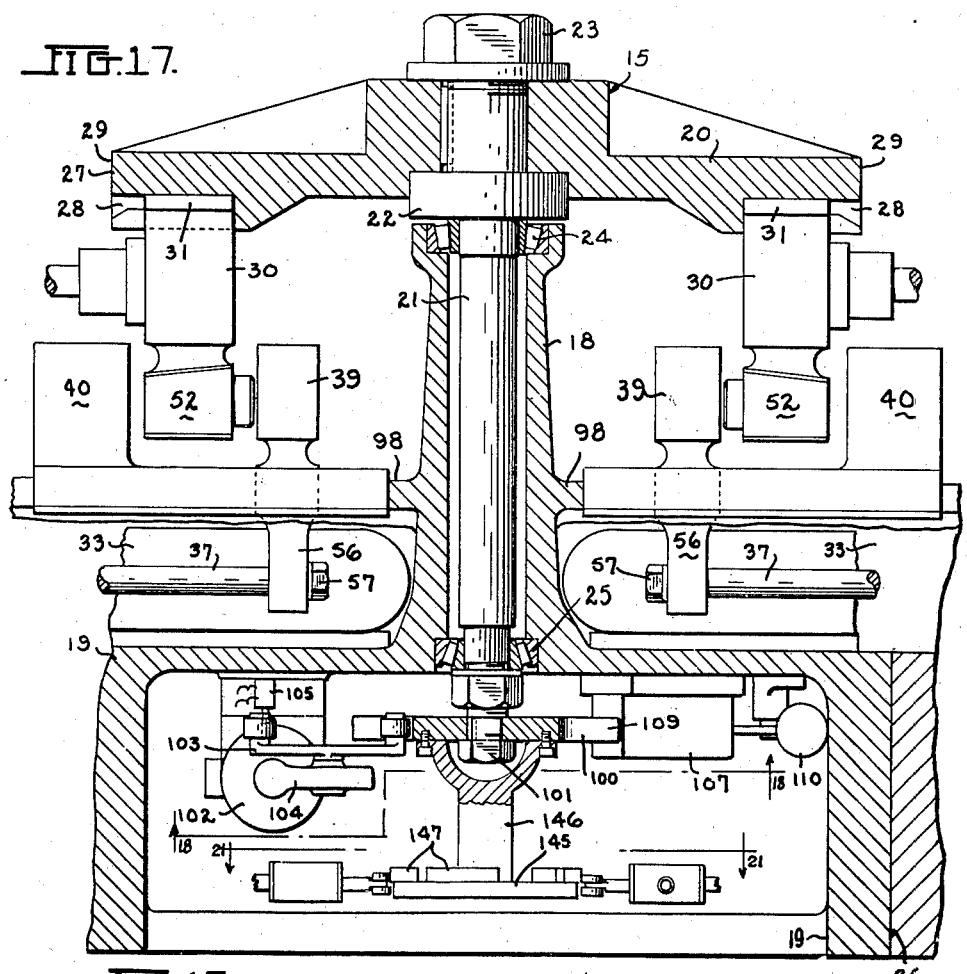

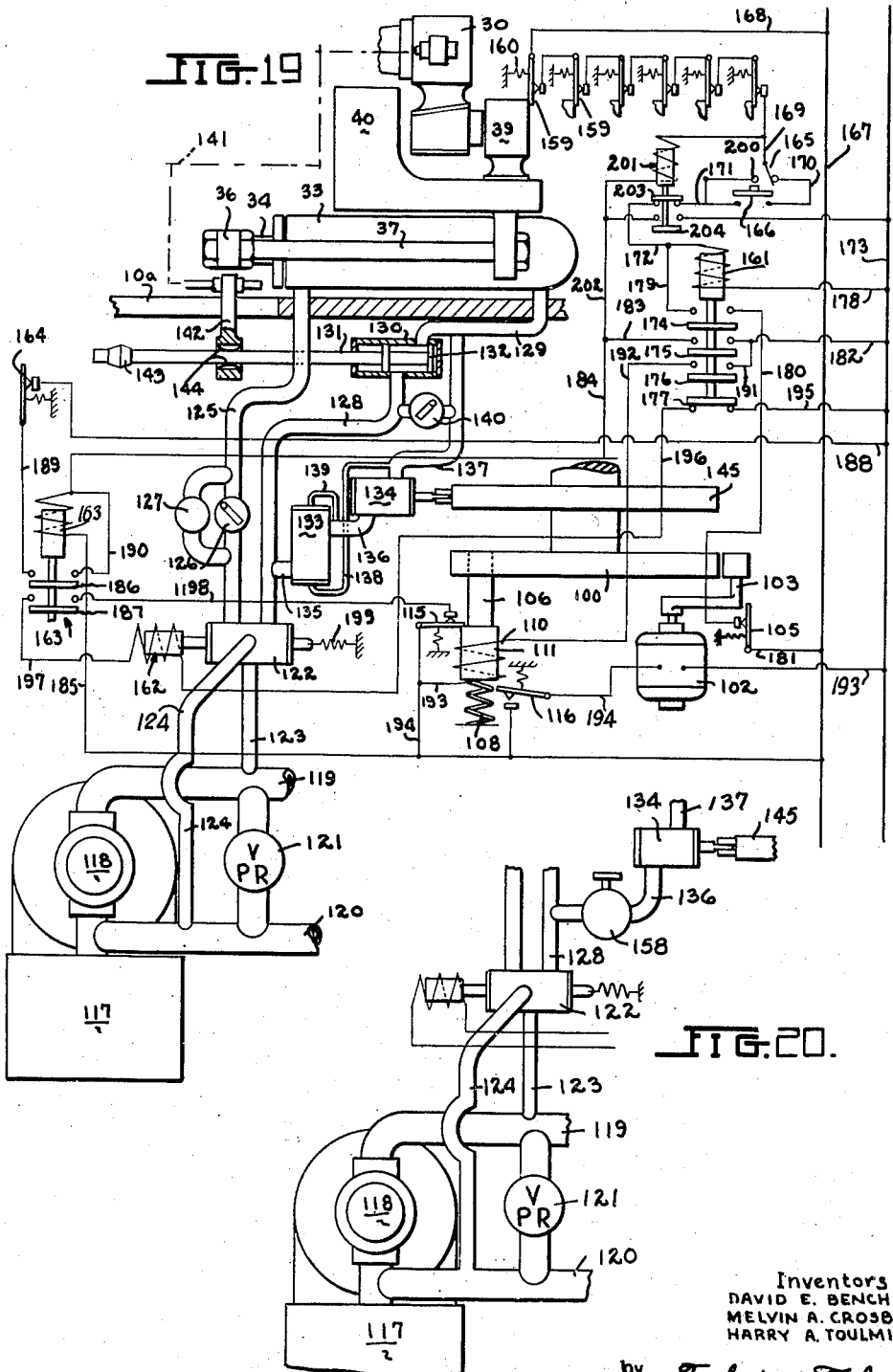

April 24, 1945.  D. E. BENCH ET AL  2,374,577
MULTIPLE TURRET LATHE
Original Filed Sept. 25, 1941  11 Sheets-Sheet 7
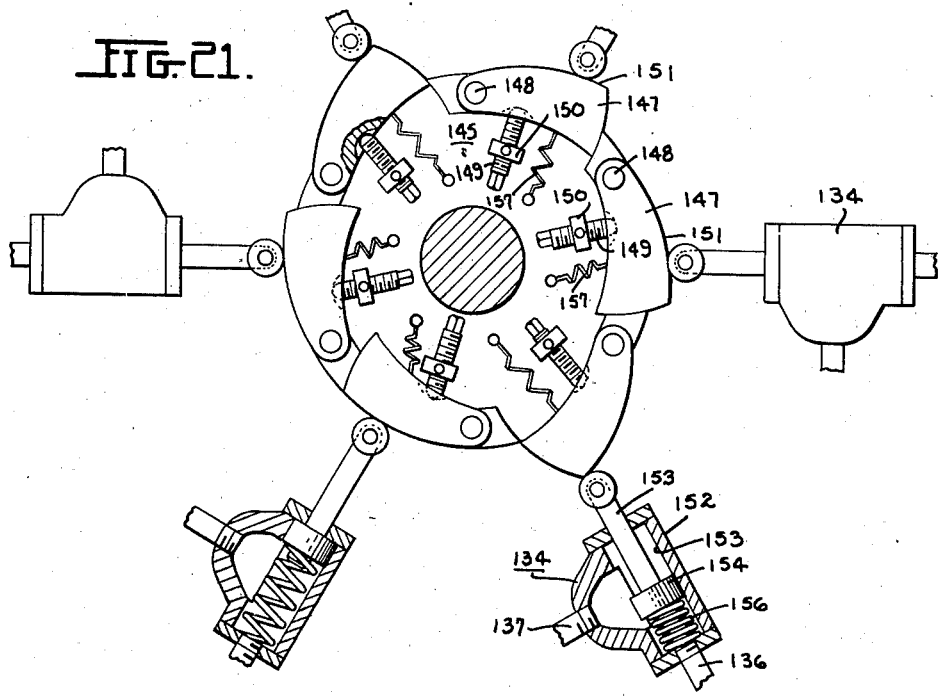
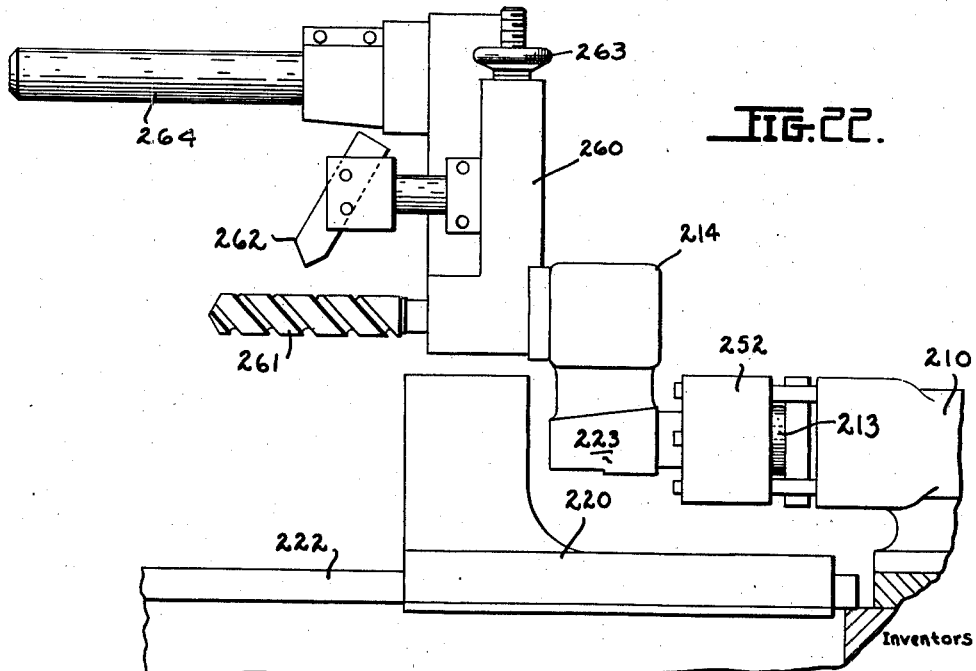
Inventors
DAVID E. BENCH
MELVIN A. CROSBY
HARRY A. TOULMIN JR.
by Toulmin & Toulmin
Attorneys

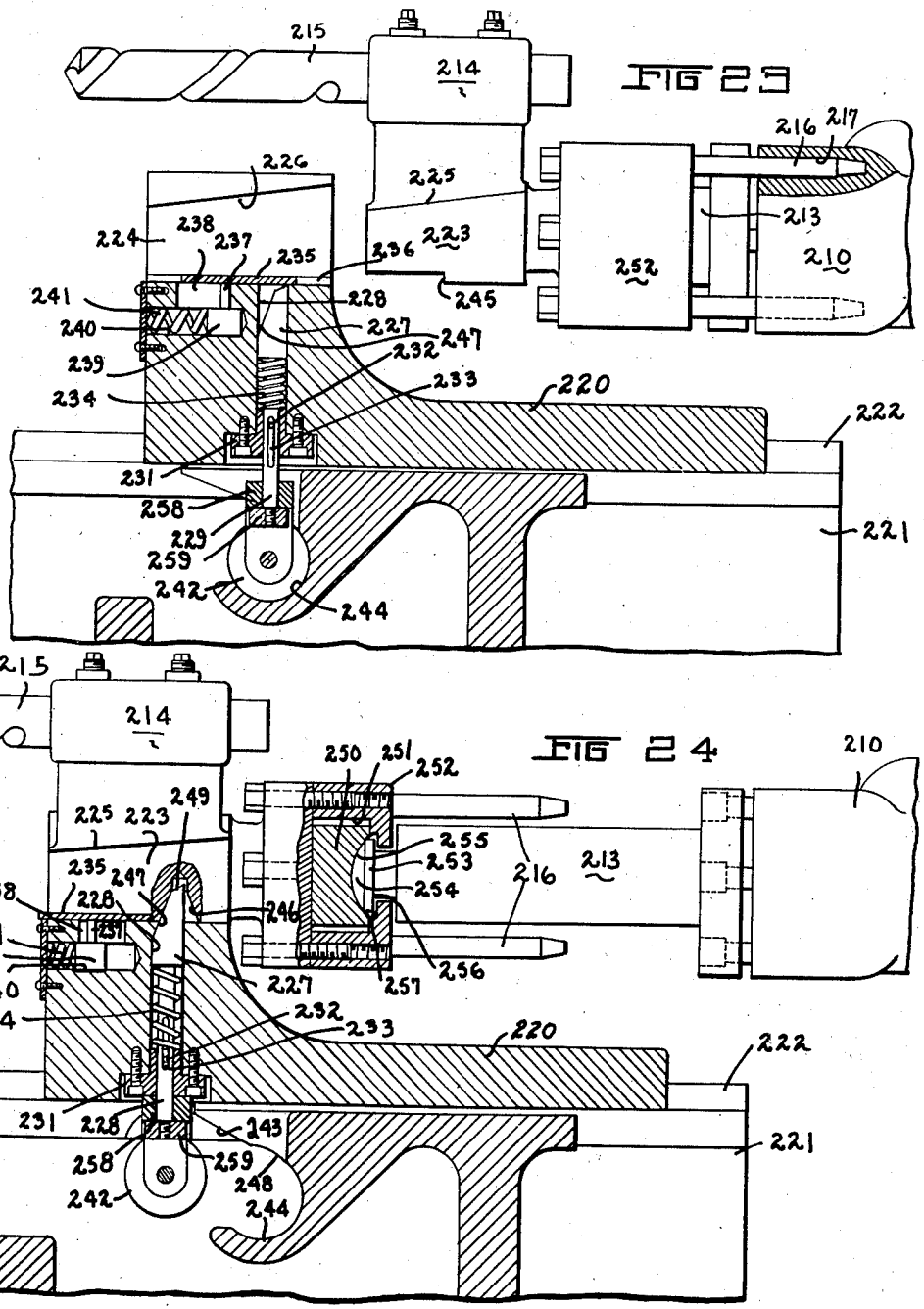

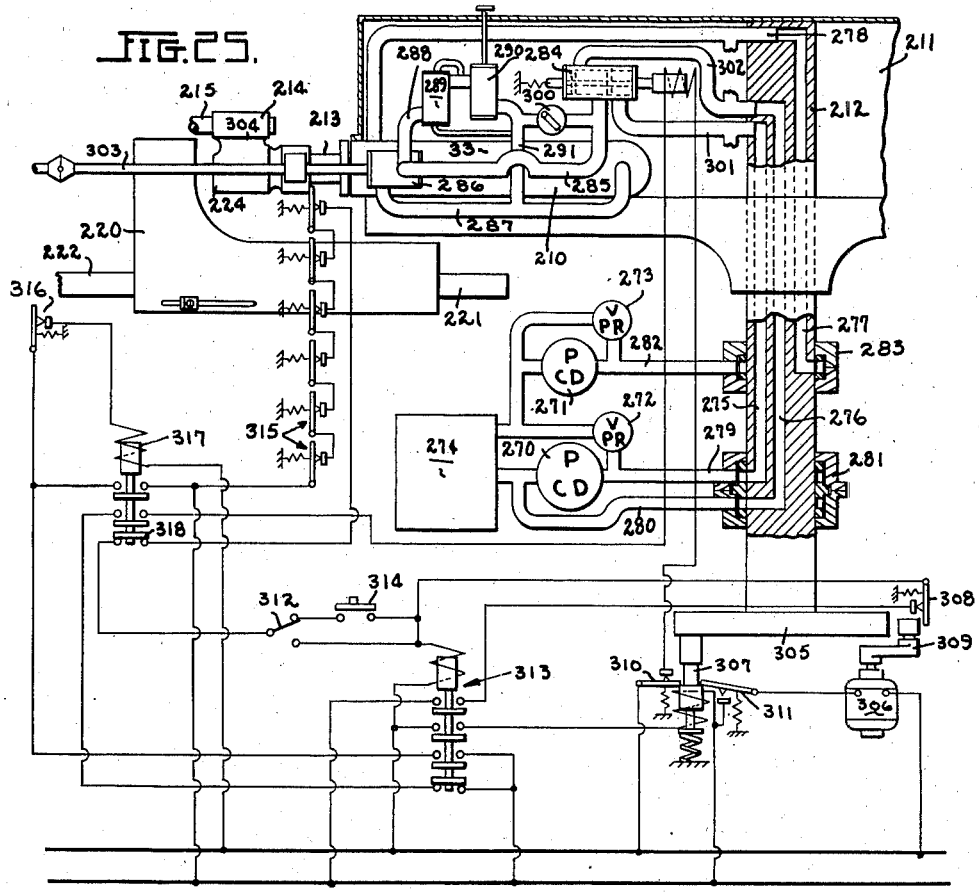

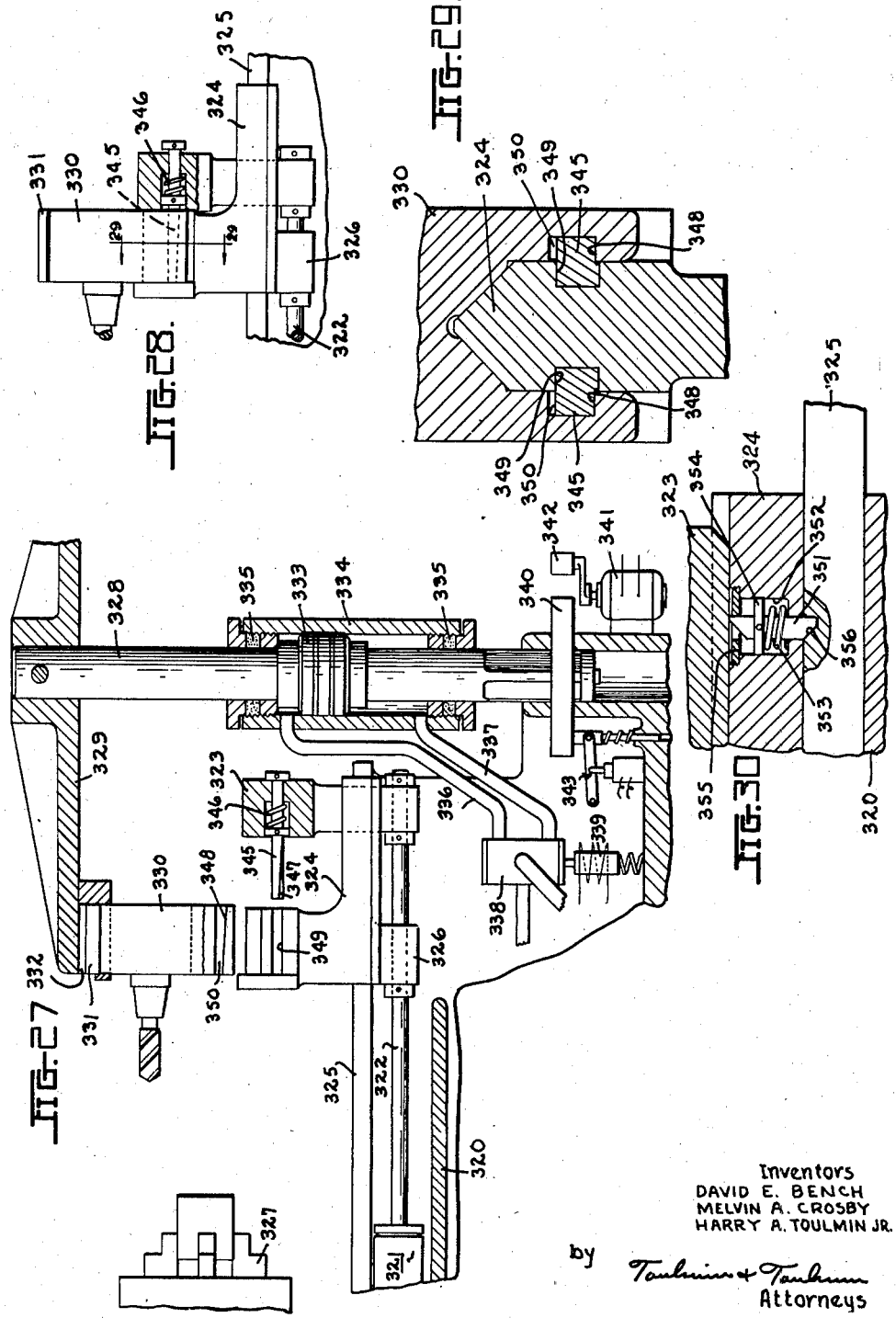

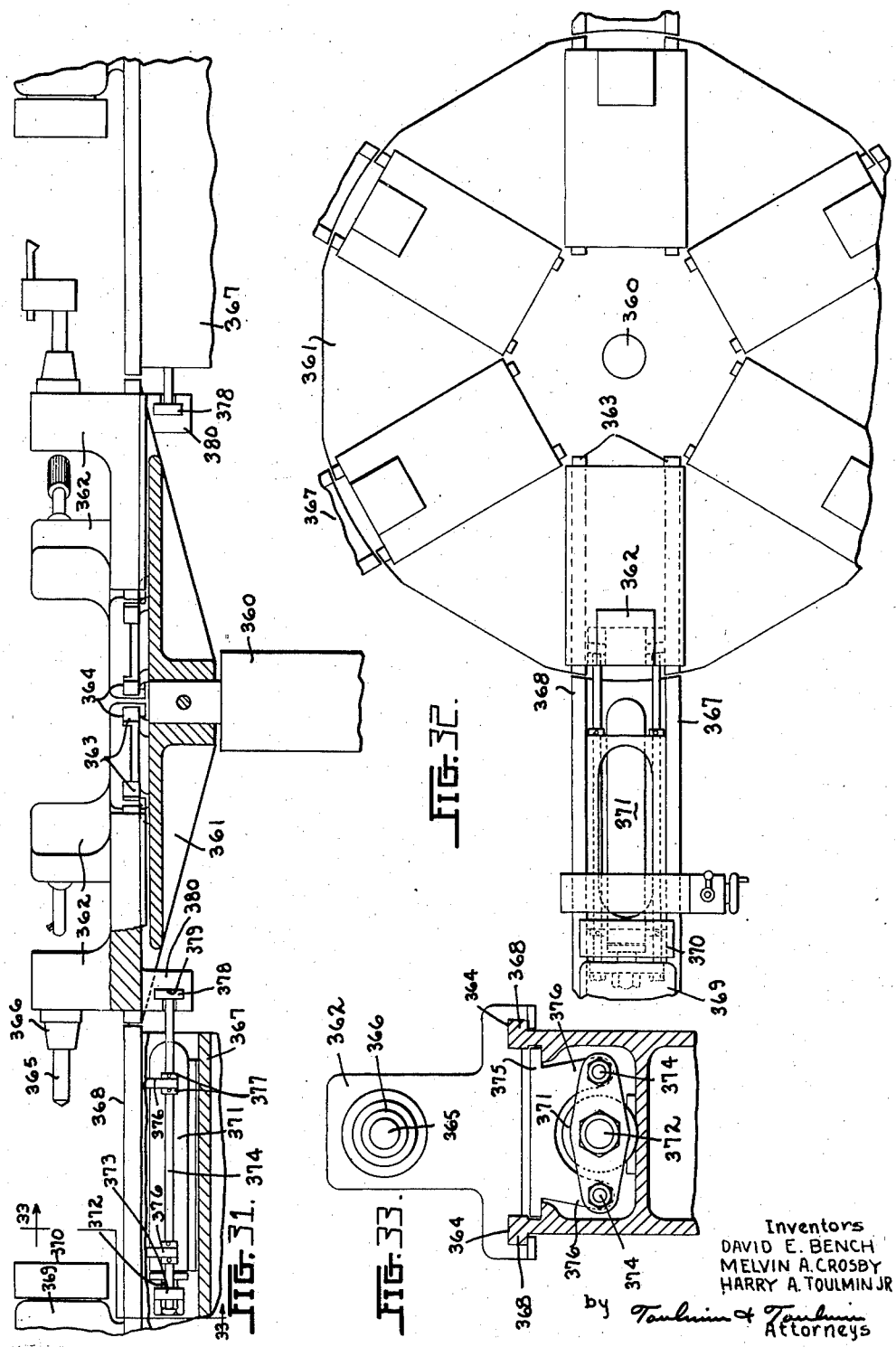

Patented Apr. 24, 1945

2,374,577

UNITED STATES PATENT OFFICE 2,374,577

MULTIPLE TURRET LATHE

David E. Bench, Melvin A. Crosby, and Harry A. Toulmin, Jr., Dayton, Ohio, assignors to The Hydraulic Development Corp., Inc., Dayton, Ohio, a corporation of Delaware Original application September 25, 1941, Serial No. 412,268, now Patent No. 2,330,859, dated October 5, 1943. Divided and this application August 20, 1942, Serial No. 455,466

19 Claims. (Cl. 29—41)

This invention relates to a turret lathe capable of working upon a plurality of work pieces simultaneously.

An object of the invention is to provide a plurality of rotatable workholding devices disposed radially about a turret having a plurality of work tools adapted to be brought into working engagement with the work pieces for simultaneous operation upon the work pieces.

Another object of the invention is to provide a turret lathe capable of working upon a plurality of work pieces simultaneously and having hydraulic means for moving the tools with respect to the work pieces.

Another object of the invention is to provide a turret lathe having a plurality of work carrying spindles positioned radially about the turret, said turret being constructed and arranged to successively position a plurality of tools into operative engagement with the work pieces carried by the work spindles.

Another object of the invention is to provide a turret lathe in accordance with the foregoing object wherein the tools are actuated with respect to the work pieces by hydraulic means.

Another object of the invention is to provide an automatically operated turret lathe in accordance with the foregoing objects.

Another object of the invention is to provide a turret lathe having a plurality of headstocks positioned radially about a turret which is adapted to carry the tools from one station to another adjacent the several headstocks and means to move the tools with respect to the work pieces carried by the headstocks.

It is another object of the invention to provide a turret lathe in accordance with the foregoing object wherein the tools are carried by the turret from one station to another and then are positioned upon a saddle for carrying the tool into operative relationship with the work piece carried by the headstock.

Another object of the invention is to provide a plurality of individual lathe units radially positioned about a turret which is adapted to be operated to bring the tools carried by the turret into successive operative relationship with respect to the work piece carried in the several lathes whereby a plurality of work pieces is manufactured simultaneously.

Another object of the invention is to provide a turret lathe wherein the tools carried by the turret are moved with respect to the work piece by hydraulic means.

Another object of the invention is to provide a turret lathe wherein the turret carries a plurality of tools into successive operating stations and hydraulic apparatus is provided for moving the tool from the turret into engagement with a saddle for carrying the tool into operative engagement with a work piece.

It is another object of the invention to provide a turret lathe wherein the turret provides the transporting device for a plurality of tools from one station to another and saddles carried upon the bed of the lathe support the tool in its movement with respect to a work piece.

Another object of the invention is to provide a turret lathe in accordance with the two foregoing objects wherein the tools are moved by hydraulic apparatus.

It is another object of the invention to provide a turret lathe wherein a plurality of tools is moved at a predetermined rate in accordance with the type of work being done by the tool.

It is another object of the invention to provide a turret lathe in accordance with the foregoing object wherein the tool is rapidly moved into operative relationship with respect to a work piece and movement thereof is then controlled at a predetermined rate of movement during the cutting portion of the stroke of movement of the tool.

It is another object of the invention to provide an apparatus for producing a rapid traverse of a tool with respect to a work piece when approaching or leaving the work piece and for controlling the rate of movement during the cutting or operating portion of the cycle of movement of the tool.

It is another object of the invention to provide a turret lathe wherein a plurality of work pieces is positioned in a fixed relationship with respect to the turret and the turret is rotated to bring the tools thereof into successive engagement with the work pieces for successively producing a plurality of operations on a work piece.

It is another object of the invention to provide an apparatus in accordance with the foregoing object wherein the tools carried by the turret are actuated by hydraulic means.

Another object of the invention is to provide a turret lathe wherein the work tools are removably carried upon the turret and are adapted to be positioned within saddles which carry the tool into operative relationship with respect to a work piece, and to provide apparatus for locking the tool to the saddle.

Another object of the invention is to provide an apparatus in accordance with the foregoing object wherein hydraulically actuated apparatus moves the tool into operating position upon the saddle and then moves the saddle with respect to the work piece in the lathe to engage the tool with the work piece.

It is another object of the invention to provide an apparatus in accordance with the foregoing object wherein the means for moving the tool and saddle is a hydraulic means.

It is another object of the invention to provide an apparatus for controlling the movement of the tool with respect to the work piece at a relatively constant rate regardless of the resistance to forward movement made by the tool.

It is another object of the invention to provide a turret lathe having a plurality of tools carried thereupon adapted to be removed from the turret into saddles for carrying the same into operative relationship with respect to a plurality of work pieces positioned radially about the turret.

It is another object of the invention to provide an apparatus in accordance with the foregoing object wherein a locking mechanism is provided between the tool, the saddle and the means for moving the tool with respect to the saddle.

It is another object of the invention to provide an apparatus in accordance with any of the foregoing objects wherein the tool is brought into engagement with the saddle and to provide means for accurately positioning the tool with respect to the work piece carried in the lathe.

It is another object of the invention to provide a turret lathe wherein the tools thereof are hydraulically actuated.

It is another object of the invention to provide means for independently controlling the movement of a work tool with respect to a work piece in a turret lathe.

It is another object of the invention to provide an automatically operated turret wherein the turret is indexed, the tools are transported by the turret between the several stations of the lathe, and the tools are hydraulically moved with respect to the work piece when positioned in the several stations, all of which operations are under full automatic control or under semi-automatic control for one complete cycle of operation.

It is another object of the invention to provide an automatic control system for a turret lathe having a plurality of hydraulically actuated tools.

It is another object of the invention to provide a turret lathe adapted to have a plurality of work pieces positioned therein, the turret lathe also having a plurality of tools hydraulically moved with respect to the work pieces when brought adjacent thereto, the movement of each of the tools being automatically controlled at a proper rate of movement with respect to the work piece when brought into successive position with respect to the several work pieces.

It is another object of the invention to provide automatic control over the movement of the work tools in accordance with the foregoing object wherein apparatus positioned adjacent each of the work stations regulates the movement of tools and is constructed and arranged to control each of the tools at its proper rate of advancement with respect to the work piece when the respective tools are brought into proper position.

Another object of the invention is to provide a turret lathe wherein the tools are actuated hydraulically in their advancement to and away from the work piece and are carried by the hydraulic apparatus.

It is another object of the invention to provide a turret lathe having a plurality of radially disposed hydraulic cylinders forming the turret for the lathe wherein the plunger of each of the cylinders carries a suitable work tool.

It is another object of the invention to provide a turret lathe in accordance with the foregoing object wherein the plungers of the various cylinders move the tools carried thereby into engagement with saddles which support the tools when the tools are in working engagement with the respective work pieces.

It is another object of the invention to provide locking means between the tool and the saddle of the turret lathe of the foregoing object.

Another object of the invention is to provide a turret lathe adapted to support a plurality of work pieces upon which work is simultaneously performed by means of a plurality of work tools having a turret for transporting the tools between the several stations and means for removing the tools from the turret into engagement with the work pieces.

Further objects and advantages will becomes apparent from the drawings and the following description.

This application is a division of application Serial No. 412,268, filed September 25, 1941, now Patent No. 2,330,859, issued October 5, 1943.

In the drawings:

Figure 1 is a top plan elevational view of a turret lathe constructed in accordance with the teachings of this invention.

Figure 2 is a longitudinal cross-sectional view of a portion of a lathe taken along line 2—2 of Figure 1, the headstock portion of the lathe is in elevation.

Figure 3 is a cross-sectional view similar to Figure 2 but omitting the headstock portion of the lathe and shows one step of the locking operation between the work tool and the hydraulic means for actuating the same.

Figure 4 is a cross-sectional view similar to Figure 3 showing the locking of the work tool within the saddle provided for carrying the same in movement with respect to the work piece.

Figure 5 is a cross-sectional view similar to Figure 3 showing the work tool in working engagement with the work piece.

Figure 6 is a transverse cross-sectional view taken substantially along line 6—6 of Figure 5.

Figure 7 is a cross-sectional view similar to Figure 9 showing the locking mechanism in the unlocked position.

Figure 8 is a horizontal cross-sectional view taken substantially along line 8—8 of Figure 6.

Figure 9 is a longitudinal cross-sectional view taken along line 9—9 of Figure 6. showing the locking mechanism in the locked position.

Figure 10 is a horizontal cross-sectional view similar to Figure 8 showing the actuating mechanism for the lock of Figure 9 in the position for actuating the device as shown in Figure 9.

Figure 11 is a longitudinal cross-sectional view similar to Figures 7 and 9, showing the locking mechanism in the act of unlocking the tool moving member from the tool.

Figure 12 is a horizontal cross-sectional view similar to Figures 8 and 10, showing the actuating mechanism for the lock in the position for actuating the lock in the manner shown in Figure 11.

Figure 13 is an enlarged cross-sectional view taken along line 13—13 of Figure 4 showing the mechanism for locking the saddle to the lathe bed.

Figure 14 is a cross-sectional view taken along line 14—14 of Figure 13 showing the apparatus for operating the locking mechanism of Figure 13.

Figure 15 is a view similar to Figure 14 showing the apparatus for locking the locking mechanism in the locked position.

Figure 16 is a partial cross-sectional view similar to Figure 13 showing the locking mechanism between the saddle and the lathe bed in the unlocked position.

Figure 17 is a longitudinal cross-sectional view of the turret of the lathe taken along line 17—17 of Figure 1.

Figure 18 is a bottom elevational view taken along line 18—18 of Figure 17 showing the Geneva mechanism and the locking means for the same for indexing the turret.

Figure 19 is a schematic diagram showing the electrical system and the hydraulic system for the automatic operation of the turret lathe.

Figure 20 shows a slightly modified form of the hydraulic system for the lathe.

Figure 21 is a cross-sectional view taken along line 21—21 of Figure 17 showing the means for controlling the movement of the work tools with respect to the work pieces when the turret transports the tools with respect to the various stations of the lathe.

Figure 22 shows a modified form of the invention wherein the hydraulic cylinders for moving the tools are carried by the turret.

Figure 23 is a view similar to Figure 22 showing a portion of the mechanism in cross-section to disclose the locking apparatus between the tool carrying member and the saddle of the lathe.

Figure 24 is a view similar to Figure 23 showing the locking mechanism in lock position.

Figure 25 is a schematic diagram showing the electrical system and the hydraulic system for actuating the turret lathe disclosed in Figures 22 to 26 inclusive.

Figure 26 is a top plan view of a turret lathe wherein the cylinders are carried by the turret.

Figure 27 is a cross-sectional view showing a modified form of the invention wherein the turret for transporting the tools between the various stations of the lathe is moved in a vertical direction to remove the tool carrying member from the saddle of the lathe.

Figure 28 is a partial view of Figure 27 showing the tool in locked position upon the saddle.

Figure 29 is a cross-sectional view taken along line 29—29 of Figure 28.

Figure 30 is a cross-sectional view of a portion of the saddle of Figure 27 showing the locking mechanism between the saddle and the way.

Figure 31 is a longitudinal cross-sectional view of a modified form of the turret lathe wherein the tools are completely removed from the lathe bed during transportation between the various stations.

Figure 32 is a top plan view of the apparatus of Figure 31.

Figure 33 is a cross-sectional view taken along line 33—33 of Figure 31.

The turret lathe of this invention is constructed and arranged for supporting a plurality of work pieces upon individual rotating spindles disposed radially about a central turret. Each of the spindles is preferably a part of a conventional headstock for a lathe which controls the speed of operation of the work piece carried thereon. The central turret is provided for transporting a plurality of tools into operative relationship with respect to each of the work pieces carried upon the headstock by a series of successive indexing operations of the turret. Each of the tools therefore is positioned with respect to the work piece so that the operation of each of the tools can be performed upon each of the work pieces without removing the same from their spindles until the total number of operations provided for by the turret is completed.

The tools are adapted to be removably carried upon the turret so that they can be removed and placed into engagement with suitable saddles provided upon the lathe bed adjacent each of the headstocks. A hydraulic motor is provided for moving the tools from the turret into engagement with the saddles and for moving the tool when in the saddle into working engagement with a work piece carried upon the headstock. The tool is replaced upon the turret by means of a hydraulic motor after its operation upon the work piece has been completed so that the turret can index the tool to the next successive station under control of automatic means.

By radially disposing a plurality of headstocks about a centrally disposed turret a plurality of individual work pieces can be simultaneously worked upon to produce articles which necessitate rather complicated tooling set ups. The various head stocks composing the lathe can either be positioned upon a single casting suitably constructed with radially disposed beds from a central turret or individual lathe beds can be radially positioned about a central turret and properly aligned therewith.

In this invention the lathe consists of a lathe bed, generally indicated by the numeral 10, which is composed of a plurality of individual beds 10a radially disposed with respect to one another. The bed 10 can be a unit structure, or may be composed of a plurality of individual beds which are properly secured together to produce a unit structure. The beds 10a are preferably individually constructed since the size of the apparatus lends itself more favorably to the construction of individual units which can be assembled into a larger unit machine.

Each of the beds 10a comprises part of a complete lathe with the exception that the usual tailstock is omitted.

Upon each of the beds 10a there is provided a headstock 11 having a work spindle driven by the conventional mechanism associated with the usual headstock arrangement for lathes and upon which a chuck 12 is adapted to be positioned. The chuck 12 is adapted to carry a work piece 13 for rotation with respect to the tools carried upon a central turret 15. It is of course understood that while a chuck has been mentioned as providing the apparatus for holding the work piece 13, any other apparatus for securing the work piece in position for rotation with respect to the work tools can be provided and be suitably mounted upon the spindle extending from the headstock 11.

The headstock 11 is provided with the usual controls for regulating the speed of rotation of the spindle and thus controls the speed of rotation of the work piece with respect to the tools carried by the turret 15 for regulating the cutting speed for the various controls.

Each of the beds 10a is provided with the usual ways 14 upon which a carriage 16 is positioned for longitudinal movement along the lathe. The carriage 16 may be provided with a square turret 17 for producing various transverse cuts upon the work piece 13.

It is to be understood that the carriage 16 and the square turret 17 are conventional mechanisms adapted for use in lathe work and it is therefore believed that further description of this apparatus is not necessary. It is to be understood that the usual automatic controls provided for operating the carriage and the square turret are provided on the lathe of this invention for producing automatic operation of the carriage 16 and the turret 17.

In all respects the lathe thus far described is a conventional apparatus and can be provided with all of the usual controls found upon lathes for controlling cutting speeds, transverse and longitudinal movement of the work tools and other controls usually associated with such lathe mechanisms.

The turret with which the lathe beds 10a are associated consists of a hexagonal base 19 having a centrally located turret supporting post 18. A turret 20 is provided with a supporting shaft 21 which is secured centrally within the turret 20. The shaft 21 has an enlarged annular portion 22 which engages the underside of the turret 20 for supporting the turret while a nut 23 is threaded upon the shaft 21 for engaging the upper face of the turret 20 and thereby securing the same to the shaft 21. The turret post 18 is provided with an upper tapered roller bearing 24 upon which the annular enlarged portion 22 is supported and thereby provides a thrust bearing for the turret 20 for supporting the same. A tapered roller bearing 25 is provided in the lower portion of the turret post 18 for guiding the turret shaft 21.

The hexagonal bed 19 has finished faces 26 (as shown in Figure 17) against which the lathe beds 10a abut for positioning the beds 10a with respect to the base 19 and thus with respect to the turret 20. Suitable means are provided for securing the beds 10a to the base 19.

The turret 20 is centrally disposed with respect to the lathe beds 10a radially positioned about the hexagonal base 19. The turret 20 comprises a horizontally positioned plate 27 which is provided with a hexagonal shape to correspond with the hexagonal positioning of the lathe beds 10a about the base 19. While the invention discloses the use of a hexagonal turret and lathe arrangement yet it is to be understood that any number of lathe beds can be positioned about a centrally located turret depending upon the usage to which the machine is to be put. The turret plate 27 is provided with a T-slot 28 positioned adjacent each of the sides 29 of the turret 20.

A tool carrier 30 has a T-shaped head 31 which cooperates with the T-slot 27 in the turret 20 for supporting a tool 32 in position with respect to the turret 20. The cooperation of the T-slot 27 with the T-head 31 of the tool carrier 30 permits the tool carrier 30 to be slidably removed from the turret 20 for advancement into working engagement with a work piece carried by one of the headstocks 11. When the tool carrier 30 is positioned with the T-head 31 within the T-slot 27, the tool carrier is arranged for transportation between the stations of the lathe as represented by the respective lathe beds 10a.

Each of the lathe beds 10a is provided with a hydraulic motor 33 having a double acting piston therein to which the plunger rod 34 is attached. The hydraulic cylinders 33 are bolted to their respective lathe beds 10a by means of bolts 35, as indicated in Figure 13. The plunger 34 carries a crosshead at the forward end thereof from which there extends a pair of rods 37 secured to the crosshead 36 by means of bolts 38. The rods 37 extend toward the center of the apparatus upon both sides of the cylinder 33, the crosshead 36 and the rods 37 thus providing a yoke which is secured to a tool moving member 39.

The tool moving member 39 is slidably carried upon a saddle 40, which saddle is slidably supported upon the ways 14 of the lathe bed 10a. Each of the lathe beds 10a is provided with a saddle 40 and a tool moving member 39 so that the tool carrier 30 can be slidably removed from the turret 20 and positioned upon the saddle 40.

The saddle 40 is provided with a recess 42 (see Figure 6) which cooperates with the ways 14 of the lathe bed for supporting and guiding the saddle 40 during its longitudinal movement upon the ways 14. A plate 43 is secured to the saddle 40 and extends inwardly toward the center of the lathe bed for sliding engagement with the under side of the ways 14 thereby preventing the saddle 40 from rising from the ways 14. The saddle 40 is also provided with a pair of upwardly extending wall members 44 and 44a which form a yoke having a central opening 45. The wall members 44 and 44a are each provided with a recess 46 and 46a having right angular sides for supporting the tool carrier 30 when in position therein.

The recess 46 in the wall member 44 has a wall 47 which is parallel to the longitudinal axis of the lathe bed 10a and has an upper wall 48 which is tapered upwardly in the direction of the position of the tool carrier 30. The recess 46a is provided with a vertical wall 49 which is tapered outwardly and rearwardly with respect to the position of the tool carrier 30 and an upper wall 50 which is tapered in the same manner as the wall 48 of the recess 46. The bottom wall 51 of the yoke formed by the wall members 44 and 44a is parallel with respect to the lathe bed 10a.

The tool carrier 30 has a depending plug member 52 which has the walls thereof formed to the same configuration as the configuration of the recesses 46 and 46a heretofore described whereby the bottom wall 51 and the side wall 47 provide means for positioning the tool carrier 30 within the yoke provided on the saddle 40 with respect to the axial center of the spindle carried by the headstock 11. The tapered walls 48, 49 and 50 of the recesses 46 and 46a force the plug 52 of the tool carrier 30 into the proper position when the tool carrier is moved into the recesses 46 and 46a by means of the tool moving member 39.

The tool moving member 39 consists of a horizontally positioned plate 53 adapted to slidably engage recesses 54 and 54a and thereby guiding the tool moving member 39 along the saddle 40.

A pair of ears 56 depends from the plate 53 and is secured to the plunger rods 34 by means of the bolts 57. The tool moving member 39 is thus connected to the hydraulic motor 33 which causes reciprocation of the tool carrying member 39 upon the saddle 40 when moving the tool carrier 30 from the turret 20 into engagement with a yoke 44, 44a provided on the saddle 40.

Locking mechanisms are provided for latching and unlatching the tool moving member 39 to the tool carrier 30 and for latching and unlatching the tool carrier 30 to the saddle 40.

The locking mechanism for securing the tool moving member to the tool carrier 30 is shown in Figures 6 to 12 inclusive in various positions during the latching and unlatching of the tool moving member 39 to the tool carrier 30. The plug member 52 of the tool carrier 30 is provided with a reduced diameter portion 58 extending rearwardly thereof. A recess 59 is provided in the lower edge of the reduced diameter portion 58 and consists of a vertical forward face 60 and a rearwardly tapered face 61.

The reduced diameter portion 58 upon the tool carrier 30 is adapted to slidably engage a bore 62 provided in the tool moving member 39. A vertical bore 63 communicates with the bore 62. A locking pin 64 is slidably positioned within the bore 63, which pin is provided with a roller 73 suitably pivotally carried upon the lower end of the pin 64.

The pin 64 is adapted to be reciprocated vertically into and out of the recess 59 provided in the reduced diameter portion 58 of the tool carrier 30 by means of a horizontally positioned actuating rod 65 slidably carried within a bore 66 positioned transversely of the plate 53. Rollers 67 are pivotally carried upon opposite ends of the rod 65 for engaging the recesses 54 and 54a provided in the saddle 40. The rod 65 is provided with a recess 68 having an angular face 69 and a horizontal bottom wall 70. The roller 73 carried upon the pin 64 engages the faces of the recess 68 for actuating the pin 64 vertically upon transverse reciprocation of the actuating rod 65.

To obtain reciprocation of the actuating rod 65 the recesses 54 and 54a positioned within the saddle 40 are provided with suitable guide tracks for the rollers 67 carried upon the actuating rod 65. A guide track 71 is provided in the face of the recess 54 and extends rearwardly of the saddle 40. A similar guide track 71a is provided in the face of the recess 54a and extends forwardly of the saddle 40. The guide track 71 has an angularly disposed face 72 which connects the bottom of the track 71 with the face of the recess 54. The guide track 71a is provided with a similar angular face 72a for connecting the bottom of the track 71a with the face of the recess 54a. The angular faces 72 and 72a are disposed with respect to one another in such a relationship that upon forward movement of the tool carrying member 39 by means of the hydraulic motor 33, the roller 67 on the left end of the actuating rod will engage the face 72 to shift the rod 65 in a rightward direction as viewed in Figures 8, 10 and 12. When the actuating rod 65 shifts to the right the angular face 69 provided in the rod 65 engages the roller 73 to move the pin upwardly into engagement with the recess 59 provided in the reduced diameter portion of the tool carrier 30.

This locking movement of the pin 64 is in timed relation with respect to the movement of the tool moving member 39 with respect to the tool carrier 30. As viewed in Figures 7 and 8, the tool moving member 39 is disengaged from the tool carrier 30. At this time the tool carrier 30 will be carried by the turret 20 by means of the T-head 31 in the T-slot 27 in the manner shown in Figure 2. The relationship between the tool moving member 39, the tool carrier 30 and the yoke of the saddle 40 (as shown in Figure 2) is such that the tool carrier 30 is ready to be moved into engagement with the yoke of the saddle 40 after having been indexed from one station to the next, as represented by the various lathe beds 10a. As the tool moving member 39 moves forwardly with respect to the tool carrier 30 the reduced diameter portion 58 upon the tool carrier 30 enters the bore 62 provided in the tool moving member 39. When the reduced diameter portion 58 has made a substantial entry into the bore 62 the actuating rod 65 will shift in the rightward direction (as seen in Figure 8) to move the pin 64 upwardly into engagement with the recess 59 provided in the reduced diameter portion. By the time the rod 65 has completely shifted to the right the pin 64 will have the forward face thereof in engagement with the forward face 60 of the recess 59 thereby securely locking and positioning the tool moving member with respect to the tool carrier 30. This position is shown in Figures 9 and 10.

Continued forward advancement of the tool carrier moving member 39 will slide the T-head 31 of the tool carrier 30 within the T-slot 27 upon the turret 20 so that the plug 52 upon the tool carrier 30 will enter the recesses 46 and 46a provided in the yoke upon the saddle 40.

When the plug 52 substantially completes its entry into the yoke provided on the saddle 40 a locking mechanism is actuated for locking the tool carrier within the saddle 40.

This locking mechanism consists of a bellcrank lever 74 carried upon a pivot pin 75, the lever being positioned within a recess 76 provided in the forward edge of the saddle 40. One end of the bellcrank lever 74 is provided with a roller 77 while the opposite end thereof has a slot 78 which engages a pin 79 carried upon a locking pin 80 slidably positioned within a bore 81, vertically arranged within the saddle 40 and adjacent the median point of the yoke provided by the walls 44 and 44a.

The saddle 40 is normally held in locked engagement with the ways 41 of the lathe bed 10a to prevent movement of the saddle until the plug 52 of the tool carrier 30 has made complete entry into the yoke provided on the saddle 40. The saddle locking mechanism is operated concomitant with the locking operation of the tool carrier locking mechanism so that the saddle 40 will be unlocked from the ways 14 at the instant the tool carrier is locked to the saddle 40.

The saddle locking mechanism is operated by means of the tool carrier locking pin 80 (as shown in Figures 13 and 16). The saddle locking mechanisms consist of a pair of bellcrank levers 82 pivotally mounted upon the pins 83 and positioned within a recess 84 provided in the saddle 40. One end of the bellcrank 83 engages a pin 85 carried upon the lower end of the locking pin 80. The opposite end of the bellcrank lever 82 engages pins 86 carried upon the saddle locking pins 87 slidably positioned within bores 88 provided within the saddle 40. The saddle locking pins 87 have collars 89 secured near the ends thereof. Compression springs 90 are positioned around the pins 87 and have one end thereof in engagement with the collars 89 while the opposite end engages a shoulder 91 provided by the enlarged bore 92 positioned coaxially with the bore 88. Each of the ways 14 has a recess 93 into which the ends of the locking pins 87 extend when locking the saddle to the lathe bed.

The plug 52 of the tool carrying member 30 is provided with a recess 94 in the bottom edge thereof having a forward angular face 95 and a rearward vertical face 96 into which a roller 97 carried upon the upper end of the locking pin 80 thereby locks the tool carrier to the saddle yoke.

After the hydraulic motor 33 has moved the tool carrier moving member 39 into locking engagement with the tool carrier 30 (as shown in Figure 9) and has transported the tool carrier 30 forwardly to position the plug 52 thereof within the yoke of the saddle 40 the forward face of the plug 52 will engage the roller 77 carried upon the bellcrank 74 to pivot the same about the pin 75 and thereby vertically move the tool carrier locking pin 80 upwardly into the recess 94 provided in the plug 52. As the plug 52 makes complete entry into the saddle yoke the locking pin 80 rotates the bellcrank levers 82 of the saddle locking mechanism about their respective pivots 83 to draw the locking pins 87 inwardly and out of engagement with the locking recess 93 provided in the ways 41, as shown in Figure 16. The tool carrier 30 is now positioned rigidly in the saddle 40 so that the hydraulic motor 33 can move the tool 32 into working engagement with the work piece 13 carried upon the spindle extending from the headstock 11. The rate of forward advancement of the tool 32 with respect to the work piece 13 is under automatic control in a manner which will hereinafter be more specifically described.

After the work operation has been performed on the work piece the hydraulic motor is reversed in its movement, in a manner which will be described, for retracting the tool from the work piece, removing the tool carrier from the saddle, simultaneously placing the tool carrier upon the turret and then disengaging the tool carrier moving member from the tool carrier to reposition the elements as disclosed in Figure 2, whereby the turret can be indexed and the next successive tool brought into alignment with the work piece for the next successive operation.

During the initial portion of the retraction movement of the saddle, tool carrier and tool carrier moving member the elements remain in locked engagement, the saddle and the tool carrier being retained in locked engagement due to the fact that the ends of the rods 87 engage the inner faces 99 of the ways 14. When the saddle 40 reaches its initial position upon the ways 14 of the lathe bed 10a the rear end of the saddle 40 strikes a stop projection 98 (see Figure 17) whereby the saddle 40 is prevented from further retraction movement. The tool carrier and the tool carrier moving member are continued in their retraction movement by means of the hydraulic motor 33, these elements remaining in locked position and the movement of the tool carrier with respect to the saddle unlocks the carrier from the saddle. The forward angular face 95 of the recess 94 in the plug 52 of the tool carrier 30 engages the roller 97 on the locking pin 80 of the tool carrier locking mechanism whereby the locking pin 80 is caused to move downwardly, as viewed in Figure 14. This movement of the locking pin 80 causes the saddle locking pins 87 to move outwardly and position their ends within the recess 93 provided in the ways 14 of the lathe bed. The compression springs 90 aid the movement of the saddle locking pins 87 to force the same into the recess 93 when the saddle 40 is in its proper position upon the lathe ways 14. The tool carrier 30 is thus gradually unlocked from the saddle 40 and the saddle 40 locked to the ways 14.

The tool carrier and the tool carrier moving member continue their retraction movement due to operation of the hydraulic motor 33. When the forward end of the plug 52 is removed from within the yoke of the saddle 40 the tool carrier 30 will be in a position wherein the T-head 31 is positioned within the T-slot 27 upon the turret 20, the rear face of the tool carrier 30 abutting the rear face of the slot 27 whereby the carrier 30 is prevented from further retraction movement. When this position is reached the rod 65 for actuating the locking mechanism between the tool carrier 30 and the tool carrier moving member 39 has been brought into a position whereby the ends thereof are adjacent the angular faces 72 and 72a in the guide tracks 71 and 71a provided in the saddle 40. The right hand end of the actuating rod 65 engages the angularly disposed face 72a to cause the rod 65 to shift in a leftward direction (as viewed in Figure 12) whereby the locking pin 64 provided in the tool carrier moving member 39 is disengaged from the recess 59 provided in the reduced diameter portion 58 of the tool carrier 30. The tool carrier moving member 39 is thus released from the tool carrier 30 to permit the same to retract to the position shown in Figure 2 so that the end of the reduced diameter portion 58 is free of the tool carrier moving member 39. The mechanism is then ready to be indexed to bring the next successive tool into alignment with the spindle of the headstock 11.

The indexing mechanism for the turret 20 consists of a Geneva wheel 100 secured to the lower end of the turret shaft 21 by means of the bolt 101 (see Figure 17). An electric motor 102 drives a double acting arm 103 through means of a gear head 104 for actuating the Geneva wheel 100. A limit switch 105 controls the opening of the circuit to the electric motor 102 at the end of the travel of the arm 103. The Geneva wheel 100 is locked in position by means of a locking pin 106 which is slidably mounted in a casing 107. A compression spring 108 urges the pin 106 into engagement with the slots 109 of the Geneva wheel 100. An electric solenoid 110 has an armature 111 connected to the pin 106 by means of a link 112 and a bell-crank 113 for reciprocating the locking pin 106 for removing the pin 106 from the slots 109. The plunger rod 114 of the locking pin 106 actuates a pair of limit switches 115 and 116 for controlling operation of the indexing mechanism as will be hereinafter described.

The hydraulic system for controlling the movement of the tool carrier throughout its cycle of operation (see Figure 19) consists of the hydraulic motor 33 previously referred to. Fluid for serving the hydraulic motor 33 is removed from the reservoir 117 by means of a pump 118 driven by a suitable electric motor. The pump 118 is provided with a delivery conduit 119 and a return conduit 120. A by-pass valve 121 is provided between the delivery and return conduits 119 and 120 to control the maximum pressure within the delivery conduit 119. The system may be of this type using a by-pass relief valve or the pump can be of the variable delivery type wherein the pump moves to neutral upon the development of a predetermined maximum pressure.

A 4-way valve 122 is connected with a delivery conduit 119 by means of a conduit 123 and with the return conduit 120 by means of a conduit 124.

The hydraulic motor 33 is served with fluid to one end thereof through the conduit 125 in which there is positioned a choker-check arrangement consisting of a check valve 126 and a choke valve 127. The fluid passing through the conduit 125 actuates the fluid motor to retract the saddle 40, the tool carrier 30 and the tool carrier moving member 39 with respect to the headstock end of the lathe.

The opposite end of the hydraulic motor 33 receives fluid through the conduits 128 and 129, a valve 130 connecting the conduits 128 and 129. The valve 130 consists of a plunger rod 131 having a piston head 132 adapted to shut off the flow of fluid between the conduits 128 and 129 after a predetermined forward motion of the tool carrier 30 to shift the fluid supply to the fluid motor through a by-pass system.

The by-pass system consists of a constant flow control mechanism comprising a flow control valve 133 and a choke 134. The choke valve 134 is adjustable in the manner hereinafter described.

The flow control valve 133 has an inlet conduit 135 and an outlet conduit 136, which outlet conduit is connected to the inlet of the choke 134. The choke resists passage of fluid therethrough to the outlet conduit 137. The flow control valve 133 has a control conduit 138 connected to one side of the valve 133 which conducts pressure from the conduit 137 to one side of the valve 133. A second control conduit 139 is provided on the valve 133 and conducts pressure from the conduit 136 to the valve 133. The flow control apparatus herein described is of the type more fully disclosed and described in Figure 1 of the patent to T. L. Farnham #2,146,537, patented February 7, 1939. The valve system controls the flow of fluid from the inlet conduit 135 to the discharge conduit 137 at a constant flow rate regardless of the pressure developed in the conduit 137 due to the increased pressure developed in the conduit by the additional resistance met by the hydraulic motor in advancing the apparatus actuated thereby upon the work piece. A constant flow control, such as the Farnham control, provides an apparatus wherein the rate of forward movement of the work tool is always constant regardless of the resistance met by the work tool.

A check valve 140 is connected between the conduits 137 and 128 which by-passes fluid around the flow control valve 133 and the choke 134 during the return stroke of the hydraulic motor when fluid is being admitted to the motor through the conduit 125.

The valve 130 of the hydraulic system heretofore described comprises a part of the apparatus for controlling the rate of advancement of the tool with respect to the work piece. When the valve 130 is in the position shown in Figure 19, the full flow of hydraulic fluid from the pump 18 is directed to the right hand end of the motor 33 to produce a rapid forward motion of the motor and thereby cause the tool carrier 30 to be advanced rapidly into engagement with the saddle 40 and approach its working position with respect to the work piece. At a predetermined point in the forward travel of the tool carrier the valve 130 is shifted in a leftward direction so that the head 132 is positioned between the conduits 128 and 129 thus closing these conduits to flow of fluid. The fluid must then flow through the by-pass system which reduces the flow rate to that desired for the proper forward motion of the work tool with respect to the work piece. The flow rate is controlled by the choke valve 134 which is adjustable to meet varying conditions of tool movement. A suitable connecting means, indicated by the dotted lines 141 of Figure 19, interconnects the tool carrier 30 with a control member 142 reciprocable upon the plunger rod 131 of the valve 130. When the control member 142 is moved forward a collar 143 provided on the plunger rod 131 is engaged to shift the valve 130 as heretofore described. Suitable springs 144 positioned within the member 142 provide sufficient friction upon the collar 143 to shift the valve 130 by permitting the member 142 to pass over the collar 143 after the valve 130 has shifted to permit forward advancement of the work tool. A similar operation is performed when the tool is retracted. The initial rate of movement of the tool away from the work piece is governed by the by-pass system until the member 142 shifts the valve 130 to open the conduit system 128, 129. During the initial movement of retraction of the tool fluid from the right hand end of the cylinder 33 passes through the check valve 140.

The machine of this invention provides for several operations upon a work piece by various tools. It is well known that each tool requires a different speed of operation from other tools and therefore some means must be provided for changing the speed of advancement of the saddle 40 and the work tool carried by the tool carrier 30 with respect to the work piece so that as successive tools are brought into proper working relationship with the work piece that their speeds of advancement upon the work piece will be the most favorable speed for the particular tool.

The choke valve 134 must therefore be readjusted as to the flow control rate through it each time a new tool is positioned in working relationship with respect to the work piece. To change the choke valve 134 a cam plate 145 (see Figure 17) is secured to the Geneva wheel 100 by means of a post 146 bolted to the Geneva wheel 100. The cam plate 145 is more particularly disclosed in Figure 21 and consists of a plurality of individual cams 147 pivotally mounted upon the plate by means of the pivot pins 148. An adjusting screw 149 is provided for each of the cams 147 and is in threaded engagement with a boss 150. A tension spring 157 retains the inner surface of the cam 147 in engagement with the adjusting screw 149. The adjusting screw 149 positions the outer surface 151 of the cams relative to the choke valve 134.

The choke valve 134 is shown in cross-section in Figure 21 and consists of a body 152 having a plunger 153 extending therefrom. A piston 154 is slidably positioned within a cylinder 155 provided in the body 152. A compression spring 156 urges the piston 155 toward the forward end of the body 152 to provide an unrestricted passage between the inlet 136 and the outlet 137.

The cams 147 are adjusted radially outwardly with respect to the cam plate 145 to control the degree of restriction offered by the choke valve 134 when the cam engages the control rod 153 of the choke valve. Each of the tool stations is provided with a cooperating cam 147 and since the cams 147 rotate with the tools when rotated by the turret 20 it may be seen that the choke valve 139 will be adjusted by the cams 147 to control the rate of flow of fluid therethrough and thus the speed of forward advancement of the tool with respect to the work piece. Each of the tools thus has its own controlled speed which can be readily adjusted to meet varying conditions.

In Figure 20 there is disclosed a modification of the hydraulic system for regulating the flow of fluid to the hydraulic cylinder 33. In this modification a pressure regulating valve 158 is positioned between the choke valve 134 and the fluid conduit 128. The pressure regulating valve 158 controls the pressure in the conduit 136 at a substantially constant level so that a predetermined pressure differential is provided across the choke valve 134. Since the resistance made by the work tool is substantially constant the back pressure in the conduit 137 will be substantially constant and therefore the pressure differential across the choke valve 134 will be constant whereby a constant forward motion of the work tool across the work piece is established.

The electrical system for controlling the automatic operation of the turret lathe is disclosed in Figure 19. A plurality of limit switches 159 is placed in series electrically, each of the limit switches being associated with one of the tool carrier moving members 39. These limit switches 159 are closed when the tool moving member 39 is in its full retracted position and are opened by means of the springs 160 when the tool moving member 39 is in a forward position. A relay 161 controls the electrical energization of the Geneva wheel locking solenoid 110 and the operation of the solenoid 162 of the 4-way valve 122. The relay 161 is supplemented by means of a relay 163 which conditions the electric circuit for the solenoid 162 of the 4-way valve 122. A limit switch 164 is positioned adjacent the forward limit of the forward stroke of the tool carrier 30 or the saddle 40 for initiating the retraction stroke of the tool carrier 30.

The electrical system, as shown in Figure 19, has the elements thereof positioned in their normal deenergized positions with all of the elements at rest after the completion of the retraction stroke of the tool moving members 39. The system is in readiness for the initiation of an indexing cycle.

The initiation of the indexing cycle can be either automatically or manually controlled. A selector switch 165 is provided for controlling the condition of the electric circuit for either manual or automatic operation and as shown in Figure 19 is in position for manual operation of the initiation of the cycles of operation of the turret lathe. A push button switch 166 is provided for manually initiating the energization of the control circuit.

To begin a cycle of operation of the turret lathe the push button switch 166 is closed whereby an electric circuit is made from the power line 167 through the line 168, the limit switches 159, the line 169, 170 the push button switch 166, lines 171, 172, the relay 161 to the power line 173. The solenoid 161 is thus energized to close the blades 174, 175 and 176 upon their respective contacts and to open the blade 177 from its contacts. As soon as the relay 161 closes the blade 174 upon its contacts a holding circuit is established for the relay 161 through the line 178, the relay 161, the line 179, the blade 174, the line 180, the limit switch 105, the line 181 to the power line 167. This holding circuit is maintained until the indexing cycle is under way.

The blade 175 closes an electric circuit to a relay 201 from the power line 173 through the line 182, the blade 175, the lines 183, 202, the relay 201, the line 169, the switches 159 and line 168 through the power line 167. The relay 201 is thus energized to open blade 203 from its contacts and to close blade 204 upon its contacts. The blade 203 thus breaks the electric circuit from the selector switch 165 and the push button switch 166 to the relay 161 to prevent any subsequent control over this relay. The blade 204 provides a holding circuit for the relay 201 which is retained until one of the switches 159 breaks circuit. As soon as one of the limit switches 159 is opened the relay 201 reconditions the initiating circuit through the push button switch 166 or the selector switch 165 to permit initiation of the next cycle of operation.

At the same instant the blade 175 closes a circuit from the power line 173 through the line 182, the blade 175, the lines 183, 184 to the relay 163 and through the line 185 to the power line 167. The relay 163 thus closes the blades 186 and 187 upon their respective contacts. The blade 186 establishes a holding circuit for the relay 163 from the power line 173 through the line 188, the limit switch 164, the line 189, the blade 186, the line 190, the relay 163, the line 185 to the power line 167. The blade 187 of the relay 163 conditions an electric circuit for the solenoid 162 of the 4-way valve 122 which circuit will be hereinafter described.

Closing of the relay 161 also establishes a circuit to the Geneva wheel operating solenoid 110 from the power line 173 through the lines 182, 191, the blade 176, the line 192, the solenoid 110 and the lines 193, 194 and 185 to the power line 167. Energization of the solenoid 110 removes the locking pin 106 from the Geneva wheel 100. The movement of the locking pin 106 causes the limit switch 116 to close and the limit switch 115 to open. Closure of the limit switch 115 establishes an electric circuit to the motor 102 of the indexing mechanism from the power line 173 through the line 193, the motor 102, the line 194, the switch 116 and the line 185 to the power line 167.

The motor 102 drives the arm 103 of the Geneva mechanism for starting the Geneva wheel in its indexing motion. Soon after the arm 103 has started its movement it contacts the limit switch 105 to open the same. When the limit switch 105 opens the holding circuit the relay 161 is opened whereby the relay 161 is deenergized and the blades 174, 175 and 176 are removed from their contacts while the blade 177 closes upon its contacts. When the relay 161 becomes deenergized the electric circuit established to the Geneva wheel solenoid 110 is broken whereby the locking pin 106 is forced into engagement with the Geneva wheel by means of the spring 108. The locking pin 106 however cannot prevent the Geneva wheel from continuing its indexing motion since it cannot enter the groove 109 until the arm 103 has brought the groove 109 into proper relationship with the locking pin 106. The switch 116 remains closed to maintain circuit to the electric motor 102 until the indexing motion is completed and the locking pin 106 enters the groove 109.

When this operation occurs the switch 116 is opened to break circuit to the electric motor 102 and the switch 115 is closed to make circuit to the solenoid 162 of the 4-way valve 122. As previously mentioned relay 163 has been energized when the relay 161 was closed. The relay 163 established its holding circuit as previously described and the blade 187 is closed upon its contacts. As soon as the switch 115 is closed by the locking pin 106 an electric circuit is established to the solenoid 162 of the 4-way valve 122 from the power line 173 through the line 195, the blade 177 of the relay 161, the line 196, the solenoid 162, the line 197, the blade 187, the line 198, the switch 115 and lines 194 and 185 to the power line 167.

The solenoid 162 is thus energized to shift the 4-way valve 122 to permit hydraulic fluid to be conducted from the conduit 123 into the conduit 128 for advancing the plunger 34 of the hydraulic motor 33.

The hydraulic motor 33 will carry the tool carrier through a forward stroke in the manner heretofore described. When the tool carrier 30 and the saddle 40 reach the limit of the forward stroke the limit switch 164 is engaged to open the holding circuit previously established therethrough for the relay 163.

The relay 163 is deenergized whereby the blades 186 and 187 open circuit through their contacts and thereby deenergizing the solenoid 162 of the 4-way valve 122. Deenergization of the solenoid 162 permits the 4-way valve 122 to be returned to its initial position by means of the spring 199 whereby hydraulic fluid is then directed from the conduit 123 into the conduit 125 causing a retraction stroke of the hydraulic motor 33 and thereby carries the tool carrier 30 and the saddle 40 throughout a retraction stroke and releases the tool carrier from the saddle and the tool carrier moving member 39 from the tool carrier 30 in the manner heretofore described.

When all of the tool carrier moving members 39 are in their full retracted position the limit switches 159 will be closed and the circuit is then in condition for another cycle of operation. As shown in Figure 19 the circuit must be reenergized by means of the push button switch 166 since the selector switch 165 is in series therewith.

If the selector is in series with the contact 200 the cycle of operation will be automatically repeated since the relay 201 is now in the deenergized position with the blade 203 closed upon its contacts.

In Figures 23 to 26 there is shown a modified arrangement wherein the hydraulic cylinders for moving the tools into engagement with the work pieces are carried by the turret. Also, a modified arrangement of a locking device between the tool carrier and the saddle is shown for locking the members together for suitably guiding the tool in its working relationship with respect to the work piece carried in the spindle of the lathe. Figures 25 and 26 show in diagrammatic form the relationship of the hydraulic cylinders with respect to the turret for being supported thereby and with respect to the saddle supported by the bed of the lathe. Figures 23 and 24 are constructional views shown in cross-section to indicate the manner in which the tool carrier and the saddle are locked together during the concomitant travel.

In this modification a hydraulic motor 210 is provided for moving each of the work tools into engagement with the work piece. The motors 210 are radially disposed within a turret housing 211 suitably carried by a turret post 212. Each hydraulic motor 210 is provided with a reciprocating plunger 213 which supports a tool carrier 214 for holding a tool 215. The tool carrier 214 is provided with a plurality of rods 216 which extend rearwardly toward the motor 210 and are adapted to engage a plurality of cooperating bores 217 provided in the housing for the motor 210. When the rods 216 enter the bores 217 the tool carrier 214 is retained in its proper working position for entry into engagement with the work piece carried by the spindle of the lathe and in proper alignment with the saddle 220 carried upon the bed 221 of the lathe. The saddle 220 is guided upon suitable ways 222 provided upon the lathe bed 221 for carrying the tool carrier 214 into working relationship with respect to the work piece carried by the lathe spindle. The tool carrier 214 is provided with a wedge-shaped head 223 which is adapted to enter a wedge-shaped opening 224 in the saddle 220 so that the angular surface 225 of the wedge-shaped head 223 will engage the angular surface 226 of the wedge-shaped opening in the saddle 220. Positioning of the wedge-shaped head 223 within the wedge-shaped opening 224 locates the tool 215 during its working stroke.

In order to lock the tool carrier 214 to the saddle 220 a locking plunger 227 is positioned within a vertical bore 228 within the saddle 220. The plunger 227 is provided with a reduced diameter portion 229 which slidably engages a bore 230 in a plug 231 which closes one end of the bore 228. A pin 232 extends through the plug 231 and through a slot 233 provided in the stem or reduced diameter portion 229 of the plunger 227 whereby the plunger is prevented from rotation. A compression spring 234 is positioned between the plug 231 and the plunger 227 for urging the plunger in an upwardly direction.

The upper end of the plunger 227 engages a plate 235 slidably positioned within a groove or track 236 within the wedge-shaped opening 224 provided in the saddle 220. The plate 235 has a pin 237 extending therefrom into a slot 238 provided adjacent the wedge-shaped opening 224. The lower end of the pin 237 carries a piston 239 slidably positioned within a bore 240 provided in the saddle 220. A compression spring 241 urges the piston 239 in a rightward direction, as viewed in Figure 23, and thus normally pushes the plate 235 across the slot 238 to retain the plunger 237 in a downward position against the compression of the spring 234.

The lower end of the stem 229 of the plunger 227 carries a yoke 258 having a roller 242 positioned at opposite ends thereof. The yoke 258 is secured to the stem 229 by means of the nut 259.

The rollers 242 engage an inclined surface 243 provided upon the lathe bed 221 and adjacent each of the rollers 242. Each of the declining surfaces 243 terminates in arcuate surfaces 244 forming a hook into which the rollers 242 are forced to lock the saddle 220 in position upon the lathe bed 221, as shown in Figure 23.

The locking mechanism just described operates in the following manner. When the hydraulic motor 210 moves the tool carrier 214 forwardly to cause engagement of the wedge-shaped head 225 with the wedge-shaped opening 224, a shoulder 245 provided upon the lower surface of the wedge-shaped head 225 engages the plate 235 to move the same in a leftward direction against the compression of the spring 241. As the wedge shaped head 225 approaches its completely entered position in the wedge-shaped opening 224 a bore 246 provided in the head 225 is brought into alignment with the bore 228 provided in the saddle 220 (see Figure 24). The bore 246 is provided with tapered side walls to engage a tapered surface 247 provided on the plunger 227. The first movement of the plunger 227 is a vertical movement to permit the roller 242 to be disengaged from the lower portion of the arcuate surface 244 formed on the bed 221. The vertical movement of the roller 242 is permitted by the arcuate surface 248 which joins the arcuate surface 244 with the declining surface 243 (as shown in Figure 24).

With the roller 242 disengaged from its locking position in the hook formed by the surface 244 the saddle 220 can be moved forwardly by the action of the motor plunger 213 whereby the locking plunger 227 is permitted to move upwardly into the opening 246 in the head 225 due to the travel of the roller 242 upwardly along the declining surface 243 until the plunger 227 completely enters the bore 246 and thus locks the saddle 220 to the tool carrier 214.

On the return stroke of the tool carrier and saddle the plunger 227 is forced downwardly by engagement of the roller 242 with the declining surface 243 until the edge of the angular surface 249 provided on the tip of the plunger 227 is adjacent the plate 235. The spring 241 will then force the plate 235 over the angular surface 249 and force the plunger 227 in a vertical direction to lock the roller 242 in the hook provided by the surface 244.

In order to provide for any slight misalignment between the hydraulic motor 210 and the tool carrier 214 when positioned in the saddle 220 an aligning mechanism is positioned between the plunger 213 of the motor 210 and the tool carrier 214. This aligning mechanism consists of a plug 250 which is placed within a recess 251 provided in a housing 252 which is secured to the tool carrier 214. The plug 250 is of slightly less dimension than the recess 251 to permit movement thereof in a vertical plane through the housing 252. The end of the plunger 213 is provided with a head 253 having a rounded end 254 which engages a concave surface 255 provided in the plug 250. Cooperation of the surface 255 with the end 254 of the head 253 permits angular motion between the tool carrier 214 and the plunger 213 to permit the tool carrier 214 to properly align within the saddle 220. The plug 250 being of slightly less dimension than the recess 251 permits parallel axial misalignment between the tool carrier 214 and the saddle 220 to be corrected.

The head 253 is provided with a shoulder 256 which engages a ledge 257 provided in the housing 252 to retract the tool carrier and the saddle from its forward position and to produce cooperation between the tool carrier and the saddle for unlocking the same as previously described.

In Figure 22 there is diagrammatically illustrated the manner in which a turning head can be supported by the tool carrier 214 for producing more complicated turning operations. The turning head 260 can be provided with a drill 261 and a turning tool 262 for producing simultaneous cuts upon a work piece. The usual adjusting mechanism 263 is provided for the tool 262 and an overhead pilot bar 264 can be provided for engaging a pilot bore provided adjacent the headstock of the lathe. The apparatus of this invention is thus not limited to the use of a single tool in the tool carrier 214, but the tool carrier can be used to support a more complicated set up which can be carried by the turning head 260.

The hydraulic system for operating the apparatus shown in Figures 23 and 24 consists of a pump 270 for supplying hydraulic fluid to the hydraulic motor 210 for advancing the plunger 213. A pump 271 is provided for supplying fluid to the hydraulic motor to constantly apply pressure upon the hydraulic motor tending to continuously retract the plunger 213. The pressure developed by the pump 270 overcomes the pressure developed by the pump 271 to force the plunger 213 forwardly in a manner which will be presently described. These pumps can be either of the constant delivery type having pressure relief valves 272 and 273 respectively for relieving pressure in the system when above a predetermined pressure, or the pumps can be of the variable delivery type having means for shifting the pumping cylinders thereof to neutral. The pumps are supplied with fluid from the storage tank 274.

Since the hydraulic motors 210 rotate with the turret housing 211 it is necessary to provide some movable connection between the delivery of the pumps 270 and 271 and the inlet conduits for the motors 210. The turret post 212 is provided with three passageways, 275, 276 and 277, the passageway 275 is the discharge passage from the pump 270, while the passage 276 is for the return of fluid from the motor 210 to the storage tank 274. The passage 277 receives the discharge from the pump 271 for continuously supplying pressure in the conduit 278 to the left-hand end of the hydraulic motor 210, as shown in Figure 25. The passages 275 and 276 are connected to the pump discharge conduit 279 and the fluid return conduit 280 by means of the slip ring assembly 281, while the passage 277 is connected to the pump 271 through the conduit 282 by means of the slip ring assembly 283.

The discharge passage 275 connects to a two-way valve 284 for delivering fluid under pressure to the conduit 285 and thus to a shift over valve 286 which is identical with the valve 130 heretofore described. A conduit 287 connects the valve 286 with the right-hand end of the hydraulic motor 210 for advancing the plunger 213. A by-pass circuit consisting of the conduit 288, the flow control valve mechanism 289, a choke 290 and a conduit 291 is provided for regulating the flow of hydraulic fluid to the right-hand end of the motor 210 when the shift over valve 286 is moved to shut off the flow of hydraulic fluid in the conduit 287 in the manner heretofore described with respect to the shift over valve 130 to regulate the flow of hydraulic flow to the right-hand end of the motor 210 at a constant flow volume, regardless of the work resistance met by the work tool. The flow control valve 289 and the choke 290 are of the type disclosed and described in the patent to Farnham No. 2,146,537. A check valve 300 is provided between the conduits 291 and 285 for permitting return flow of hydraulic fluid from the right-hand end of the motor 210 during a retraction stroke thereof.

The constant pressure retained in the conduit 278 normally positions the hydraulic motor with the plunger in the retracted position. When a forward stroke of the tool carrier 214 is to be made the valve 284 is shifted to the right to open the connection between the conduit 301 and the conduit 285 whereby fluid is directed in the manner heretofore described for advancing the plunger 213 by full flow of the fluid through the conduit 287 and thus making a rapid traverse movement until the valve 286 is shifted to by-pass the flow through the conduit 285 through the flow control circuit consisting of the valve 289 and the choke 290. The pump 270 overcomes the pressure retained in the conduit 278 by the pump 271. When a retraction stroke of the pump 213 is desired the valve 284 is shifted to the right to provide communication between the conduit 285 and the conduit 302 to permit return flow of fluid through the by-pass check valve 300, the constant pressure maintained in conduit 278 retaining the plunger 213.

The shift over valve 286 is actuated by a control rod 303 passing through a control member 304, similar to the control member 142, whereby the valve 286 is shifted for establishing the point in the traverse of the tool 215 wherein the speed of movement of the tool will be regulated at a predetermined speed.

The electrical system for controlling this apparatus is substantially the same as the electrical system heretofore described with regard to Figure 19. The Geneva wheel 305 is driven by the electric motor 306 and is provided with a locking mechanism 307, similar to the locking mechanism for the Geneva wheel 100 previously described. A limit switch 308 is operated by the Geneva wheel operating lever 309 driven by the electric motor 306 in the same manner as the limit switch 105 shown in Figure 19. Limit switches 310 and 311 are associated with the Geneva wheel locking mechanism 307 and operate in the same manner as the limit switches 115 and 116 disclosed in Figure 19. A selector switch 312 determines whether or not the mechanism shall be operated on an automatic or a semi-automatic cycle, while the relay 313 functions in the same manner as the relay 161 heretofore described in Figure 19. The push button switch 314 is provided for initiating semi-automatic operation of the system. Limit switches 315 are contacted by the tool carrier 214 when in full retracted position and must all be closed to permit initiation of a new cycle of operation of the system. The limit switch 316 is positioned adjacent the forward end of the stroke of the tool and initiates retraction of the tool in the manner heretofore described in the system shown in Figure 19. The relay 317 performs the same function as the relay 163 disclosed in Figure 19. However, an extra blade 318 has been added to this relay for serving the same purpose as the relay 201 described in the operation of the system of Figure 19.

The blade 318 of relay 317 closes its cooperating contacts when the forward limit switch 316 is opened so that the circuit through the selector switch will be preconditioned before the limit switches 315 are closed. In addition, when the relay 317 is energized by the relay 313 the blade 318 opens its cooperating contacts so that the circuit through the selector switch is broken at the same instant as occurs in the operation of the relay 201 disclosed in Figure 19, since relay 201 is energized by closing of the circuit through blade 175 of the relay 161 of the system. It may therefore be seen that the blade 318 serves the same purpose as the relay 201 previously described.

The operation of the electrical system shown in Figure 25 will thus be identical with the operation of the electrical system shown in Figure 19.

In Figures 27 to 30 inclusive there is shown a modified arrangement of apparatus wherein the turret is moved vertically to lift the tool carrier from the saddle in a vertical direction to permit indexing of the tools from one station to another. In this modification the lathe bed 320 carries a hydraulic motor 321 having a plunger rod 322 extending therefrom into engagement with a tool carrier moving member 323. A saddle 324 is carried upon the bed 322 in the usual manner upon the ways 325 and is provided with a boss 326 for guiding the plunger rod 322 during its stroke. A chuck 327 is carried upon a suitable spindle.

The turret for the lathe consists of a turret post 328 having a head 329 which is adapted to support a plurality of tool carriers 330. The tool carriers 330 are removably positioned upon the turret head 329 by means of a T-head 331 which slides in suitable grooves 332 provided in the turret head 329.

The turret post 328 carries a piston 333 which is slidably positioned within a stationary cylinder having suitable sealing members 335 upon opposite ends thereof. The cylinder 334 is suitably secured to the lathe bed 320. Conduits 336 and 337 are provided for conducting hydraulic fluid to opposite ends of the cylinder 334 to raise and lower the turret head 329 in response to a suitable control mechanism. A 4-way valve 338 is provided for directing the flow of fluid to and fro within the conduits 336 and 337 in accordance with actuation of the valve by the electric solenoid 339 which is connected in the electric circuit in a manner to be described.

The turret post carries a Geneva wheel 340 which is driven by an electric motor 341 having a suitable Geneva drive 342. A turret locking device 343 is provided for locking the turret at suitable positions in the manner heretofore described with regard to the locking device shown in Figures 17, 18 and 19.

The operation of the device disclosed in Figure 27 will follow the same cycle of operation as described with regard to the systems disclosed in Figures 19 and 25, with the exception that the 4-way valve 338 shall be interposed in the electric circuit in a manner that the turret 329 will be elevated prior to the indexing operation and will be lowered after the indexing operation to permit lifting of the tool carrier 330 from the saddle 324 during the indexing operation.

The mechanism for locking the tool carrier 330 upon the saddle 324 consists of a U-shaped plunger 345 carried by the tool carrier moving member 323 and resiliently urged in the forward position by means of the spring 346. The lower faces of the U-shaped plunger 345 are provided with an angular face 347 which is adapted to engage an angular face 348 provided in the tool carrier 330. The plunger 345 is guided in the saddle 324 within a slot 349 provided therein, as shown in Figure 29.

When the tool carrier is lowered upon the saddle 324 in the relationship shown in Figure 29 the tool carrier moving member 323 is then advanced by the hydraulic motor 321 to cause the plunger 345 to enter the slot 350 provided in the saddle carrier 330 and the slot 349 provided in the saddle 324 until the angular faces 347 and 348 engage the lock the tool carrier 330 upon the saddle 324.

After the tool carrier is locked upon the saddle continued forward movement of the tool carrier moving member 323 will slide the tool carrier 330 out of the guides 332 provided in the turret head 329, whereby the tool carrier by the tool carrier can be advanced into engagement with the work piece carried by the chuck 327. All of these operations can be carried out automatically in the manner described with regard to the foregoing electric systems.

In order to lock the saddle upon the lathe bed when in the retracted position a plunger 351 is slidably positioned within a bore 352 provided in the saddle 324 (see Figure 30). A compression spring 353 normally urges the plunger 351 upwardly until a collar 354 carried thereon engages a retaining plate 355 provided for the bore 352. The lathe way 325 is prvoided with a recess 356 to receive the lower end of the plunger when forced into the same by means of the tool carrier moving member 323.

As shown in Figure 30, when the tool carrier moving member 323 moves forwardly or to the left the plunger 351 will move upwardly to release the saddle 324 from the lathe way 325, upon retraction of the tool carrier 330 and the saddle 324 by the mechanism shown in Fig. 27. The saddle 324 will be stopped in its rearward movement when the tool carrier 30 is repositioned upon the thurret head 329 whereby the plunger 351 will be positioned above the recess 356 in the lathe way 325. Continued retraction of the tool carrier moving member 323 will force the plunger 351 downwardly for locking the saddle 324 to the lathe way 325.

In Figures 31, 32 and 33 there is shown a modified structure wherein the work tools are carried directly within a saddle which is slidably mounted upon a turret and is adapted to be slidably removed from the turret to a lathe bed for bringing the work tool into engagement with a work piece carried by the spindle of the lathe. In this modification the turret post 360 supports a turret table 361 which is secured to the turret post 360 for rotation therewith. A plurality of saddles 362 is supported upon the turret table 361 by means of radially disposed guideways 363. The saddles 362 are provided with guideway recesses 364 which cooperate with the guideways 363 for permitting a sliding relationship between the saddle 362 and the guideways 363. A tool 365 is carried by each of the saddles 362 by means of a suitable chuck 366.

A plurality of lathe beds 367 is disposed radially about the turret table 361 and is positioned with respect to the turret table so that guideways 368 provided upon the lathe bed 367 cooperate with the guideways 363 upon the turret table to permit the saddles 362 to be slidably removed from the turret table 361 to the lathe bed 367. A headstock 369 is carried upon the lathe bed in conventional manner for driving a work piece supported by the chuck 370.

In order to remove the saddles 362 from the turret table 361 a hydraulic motor 371 is suitably secured to the lathe bed 367 and is radially disposed with respect to the turret table 361 in parallel relationship with respect to the guideways 368 provided upon the lathe bed 367. An actuating plunger 372 extends from the hydraulic motor 371 and is provided with a yoke 373 which carries the plunger rods 374.

The plunger rods 374 are supported by the lathe bed upon a guide plate 375 which had depending ears 376 through which the plunger rods 374 extend. The plunger rod 374 is provided with collars 377 upon opposite sides of the depending ears 376 for preventing relative movement between the plunger rod 374 and the guide plate 375 whereby the guide plate reciprocates with the plunger rod to rigidly support the same during its reciprocatory travel as driven by the hydraulic motor 371.

The plunger rod 374 is provided with an enlarged head 378 which engages a T-slot 379 in a depending boss 380 secured to the under side of the saddle 362. The cooperation of the head 378 and the T-slot 379 is such as to provide a driving connection between the plunger rod 374 and the saddle 362 for removing the saddle from the turret table 361 and placing the same upon the guideways 368 provided on the lathe bed 367.

The apparatus as shown in Figure 31 is in the position wherein the saddles 362 have either been just replaced upon the turret table 361 or are just ready to leave the turret table. Supposing that the saddles 362 have just been replaced upon the turret table 361 by means of the hydraulic motors 371, the apparatus is now in readiness for indexing of the turret table 361 to advance the work tools 365 to their next successive station. The T-slot 379 in the depending boss 380 is of such configuration as to permit movement between the T-slot 379 and the plunger rod 374 in a horizontal plane whereby the depending boss 380 on one of the saddles 362 leaves the plunger rod 374 and the next successive boss 380 can be brought into cooperating relationship with the plunger rod 374.

The actuating systems shown in Figures 19 and 25 are applicable to the apparatus shown in Figure 31 for automatically controlling the movements of the various operating mechanisms.

Having thus fully described our invention, what we claim as new and desire to secure by Letters Patent is:

1. A lathe comprising a turret having a plurality of tool carrying devices removably supported thereon, a lathe bed, a saddle supported by said bed, means movable with respect to said bed for removing said tool carrying device from said turret to position the same upon said saddle, and means for indexing the turret to bring each tool carrying device in alignment with the saddle.

2. A lathe comprising a turret having a plurality of tool carrying devices removably supported thereon, a lathe bed, a saddle supported by said bed, means movable with respect to said bed for removing said tool carrying device from said turret to position the same upon said saddle, a hydraulic motor for actuating said movable means, and means for indexing the turret to bring each tool carrying device in alignment with the saddle.

3. A lathe comprising a turret having a plurality of tool carrying devices removably supported thereon, a lathe bed, a saddle supported by said bed, means movable with respect to said bed for removing said tool carrying device from said turret to position the same upon said saddle, means for locking said tool carrying device upon said saddle, and means for indexing the turret to bring each tool carrying device in alignment with the saddle.

4. A lathe comprising a turret having a plurality of tool carrying devices removably supported thereon, a lathe bed, a saddle supported by said bed, means movable with respect to said bed for removing said tool carrying device from said turret to position the same upon said saddle, means for locking said movable means to said tool carrying device, and means for indexing the turret to bring each tool carrying device in alignment with the saddle.

5. A lathe comprising a turret having a plurality of tool carrying devices removably supported thereon, a lathe bed, a saddle supported by said bed, means movable with respect to said bed for removing said tool carrying device from said turret to position the same upon said saddle, means for locking said movable means to said tool carrying device, means for locking said tool carrying device to said saddle, and means for indexing the turret to bring each tool carrying device in alignment with the saddle.

6. A lathe comprising a turret, a plurality of tool carriers removably supported upon said turret, a lathe bed, a saddle supported by said lathe bed, a movable member for removing a tool carrier from said turret to position the same upon said saddle and for moving said saddle upon said bed with a tool carrier in position thereon, and means for indexing the turret to bring each tool carrier in alignment with the saddle.

7. A lathe comprising a turret, a plurality of tool carriers removably supported upon said turret, a lathe bed, a saddle supported by said lathe bed, a movable member for removing said tool carrier from said turret to position the same upon said saddle and for moving said saddle upon said bed with a tool carrier in position thereon, means for locking said movable member to said tool carrier actuated by the forward movement of said member with respect to said tool carrier, and means for indexing the turret to bring each tool carrier in alignment with the saddle.

8. A lathe comprising a turret, a plurality of tool carriers removably supported upon said turret, a lathe bed, a saddle supported by said lathe bed, a movable member for removing a tool carrier from said turret to position the same upon said saddle and for moving said saddle upon said bed with a tool carrier in position thereon, means for locking said movable member to said tool carrier actuated by the forward movement of said member with respect to said tool carrier, means for locking said tool carrier to said saddle actuated by the forward movement of said tool carrier with respect to said saddle, and means for indexing the turret to bring each tool carrier in alignment with the saddle.

9. A lathe comprising a turret, a plurality of tool carriers removably supported upon said turret, a lathe bed, a saddle supported by said lathe bed, a movable member for removing a tool carrier from said turret to position the same upon said saddle and for moving said saddle upon said bed with a tool carrier in position thereon, means for locking said movable member to said tool carrier actuated by the forward movement of said member with respect to said tool carrier, means for locking said tool carrier to said saddle actuated by the forward movement of said tool carrier with respect to said saddle, said locking devices having means associated therewith for unlocking said devices upon actuation thereof by the return movement of the respective members, and means for indexing the turret to bring each tool carrier in alignment with the saddle.

10. A lathe comprising a turret, a plurality of tool carriers removably supported upon said turret, a lathe bed, a saddle supported upon said lathe bed, movable means for removing a tool carrier from said turret to position the same upon said saddle, means for locking said saddle to said lathe bed actuated by relative movement between said tool carrier into said saddle and for unlocking said locking means, and means for indexing the turret to bring each tool carrier in alignment with the saddle.

11. A lathe comprising a turret, a plurality of tool carriers removably supported upon said turret, a lathe bed, a saddle supported upon said lathe bed, movable means for removing a tool carrier from said turret to position the same upon said saddle, means for locking said saddle to said lathe bed actuated by relative movement between said tool carrier into said saddle for unlocking said locking means, means for locking said tool carrier to said saddle by relative movement therebetween, and means for indexing the turret to bring each tool carrier in alignment with the saddle.

12. A lathe comprising a turret, a plurality of tool carriers removably supported upon said turret, a lathe bed, a saddle supported upon said lathe bed, movable means for removing a tool carrier from said turret to position the same upon said saddle, means for locking said saddle upon said lathe bed, means for locking said tool carrier to said saddle, means actuated by relative movement between said saddle and said tool carrier for unlocking said saddle from said bed concomitant with locking of said saddle to said tool carrier, and means for indexing the turret to bring each tool carrier in alignment with the saddle.

13. In a lathe, a turret, a plurality of tool carriers removably supported upon said turret, a lathe bed, a saddle supported upon said lathe bed, means for removing a tool carrier from said turret to position the same upon said saddle, said tool carrier said said saddle having cooperating means for positive alignment of said tool carrier with respect to said lathe bed, and means for indexing the turret to bring each tool carrier in alignment with the saddle.

14. A lathe comprising a rotatable turret, a plurality of tool carriers removably carried upon said turret, a lathe bed, a saddle movably supported by said bed, means for moving said saddle, means for elevating and lowering said turret relatively to said saddle to place a tool carrier thereon or lift to therefrom, movement of said saddle by the means therefor causing removal of a tool carrier in engagement with said saddle from said turret, and means for indexing of said turret with respect to said saddle when said tool carriers are out of engagement therewith.

15. A lathe comprising a rotatable turret, a plurality of tool carriers removably carried upon said turret, a lathe bed, a saddle movably supported by said lathe bed for supporting and moving a tool carrier carried thereby, means for moving said saddle, means for vertically reciprocating said turret with respect to said saddle for raising and lowering said tool carriers into and out of engagement therewith, and means for indexing said turret with respect to said saddle when said turret is in the elevated position.

16. A lathe comprising a rotatable turret, a plurality of tool carriers removably carried upon said turret, a lathe bed, a saddle supported by said lathe bed, means for vertically reciprocating said turret with respect to said saddle for raising and lowering said tool carriers with respect to the same, means for indexing said turret with respect to said saddle when said turret is in the elevated position, and means for removing said tool carrier from said turret while in position upon said saddle and for moving the tool carrier and saddle upon the lathe bed.

17. A lathe comprising a rotatable turret, a plurality of tool carriers removably carried upon said turret, a lathe bed, a saddle movably supported by said lathe bed for supporting and moving a tool carrier carried thereby, means for moving said saddle, a hydraulic motor consisting of a cylinder and reciprocable piston for vertically reciprocating said turret with respect to said lathe bed for raising and lowering said tool carriers with respect to said saddle, and means for indexing the turret to bring each tool carrier in alignment with the saddle.

18. A lathe comprising a rotatable turret, a plurality of tool carriers removably carried upon said turret, a lathe bed, a saddle movably supported by said lathe bed for supporting and moving a tool carrier carried thereby, means for moving said saddle, a hydraulic motor consisting of a cylinder and reciprocable piston for vertically reciprocating said turret with respect to said lathe bed for raising and lowering said tool carriers with respect to said saddle, and means for rotatably indexing said turret with respect to said saddle for bringing successive tool carriers into cooperating relationship therewith.

19. A lathe comprising a rotatable turret, a plurality of tool carriers removably carried upon said turret, a lathe bed, a saddle supported by said lathe bed, a hydraulic motor consisting of a cylinder and reciprocable piston for vertically reciprocating said turret with respect to said lathe bed for raising and lowering said tool carriers with respect to said saddle to position the tool carriers thereupon and remove the same therefrom, means for rotatably indexing said turret with respect to said saddle for bringing successive tool carriers into cooperating relationship therewith, and a hydraulic motor consisting of a cylinder and a reciprocable plunger for removing a tool carrier from said turret when it is upon said saddle and for moving said tool carrier and saddle together upon said lathe bed to produce a work operation.

DAVID E. BENCH.
MELVIN A. CROSBY.
HARRY A. TOULMIN, Jr.